US012599066B2

(12) United States Patent
  Chang

(10) Patent No.: US 12,599,066 B2
(45) Date of Patent: Apr. 14, 2026

(54) PLANTING COLUMN

(71) Applicant: SHENG SAN CO., LTD., Taichung City (TW)

(72) Inventor: Cheng-Chung Chang, Taichung City (TW)

(73) Assignee: SHENG SAN CO., LTD., Taichung City (TW)

( * ) Notice: Subject to any disclaimer, the term of this patent is extended or adjusted under 35 U.S.C. 154(b) by 0 days.

(21) Appl. No.: 18/759,042

(22) Filed: Jun. 28, 2024

(65) Prior Publication Data

US 2025/0113784 A1 Apr. 10, 2025

(30) Foreign Application Priority Data

Oct. 6, 2023 (TW) ................................. 112210835
Oct. 6, 2023 (TW) ................................. 112210837
Oct. 6, 2023 (TW) ................................. 112210838

(51) Int. Cl.
  A01G 9/12 (2006.01)
(52) U.S. Cl.
  CPC ..................................... A01G 9/12 (2013.01)
(58) Field of Classification Search
  CPC .......... A01G 9/12; A01G 9/122; A01G 9/022; A01G 9/023; A01G 9/0302; A01G 9/0295; A01G 27/006; A01G 29/00
  USPC ....................................... 47/47, 44, 46, 41.1
  See application file for complete search history.

(56) References Cited

U.S. PATENT DOCUMENTS

| | | | | | |
|---|---|---|---|---|---|
| 2,145,934 | A | * | 2/1939 | Kingman | A01C 21/00 |
| | | | | | 405/50 |
| 2,276,749 | A | * | 3/1942 | Vanderveer | A47G 7/06 |
| | | | | | 40/124.5 |
| 3,188,771 | A | * | 6/1965 | Ballai | A01G 9/00 |
| | | | | | 47/81 |
| 3,293,798 | A | * | 12/1966 | Johnson, Sr. | A01G 9/023 |
| | | | | | 47/83 |
| 3,313,333 | A | * | 4/1967 | Lordi | B65D 65/08 |
| | | | | | 220/666 |

(Continued)

FOREIGN PATENT DOCUMENTS

CN 215957369 U 3/2022

*Primary Examiner* — Timothy D Collins
*Assistant Examiner* — Maria E Graber
(74) *Attorney, Agent, or Firm* — Birch, Stewart, Kolasch & Birch, LLP

(57) ABSTRACT

A planting column includes a hollow pillar including upper and lower end portions, a body portion located between the upper and lower end portions, and an accommodating chamber located in the body portion. The upper end portion includes a top opening communicating with the accommodating chamber. The body portion includes through holes communicating the accommodating chamber with the outside of the hollow pillar. The lower end portion includes an inner surface opposite to the top opening, an outer surface, and at least one through hole penetrating through the inner and outer surfaces and communicating the accommodating chamber with the outside of the hollow pillar. The planting column is adapted for a climbing plant to grow and climb thereon, and helps for ramet of the climbing plant. The planting column is insertable in the soil, and helps for improving the soil's water permeability and breathability.

4 Claims, 31 Drawing Sheets

(56)　　　　　References Cited

U.S. PATENT DOCUMENTS

| | | | |
|---|---|---|---|
| 3,685,204 A * | 8/1972 | O'Harra | A01G 9/122 47/47 |
| 4,173,098 A * | 11/1979 | Smith | A01G 27/00 47/84 |
| 4,242,834 A * | 1/1981 | Olsen | A01G 9/0295 47/75 |
| 4,825,592 A * | 5/1989 | Earls | A01G 9/022 47/82 |
| 5,031,356 A * | 7/1991 | Thomsen | A01G 9/122 47/77 |
| 5,404,672 A * | 4/1995 | Sanderson | A01G 9/023 D11/152 |
| 5,438,797 A * | 8/1995 | Lendel | A01G 9/023 47/82 |
| 5,930,951 A * | 8/1999 | Wong | A01G 9/02 47/66.1 |
| 6,076,300 A * | 6/2000 | Cronin | A01G 29/00 47/48.5 |
| 6,185,864 B1 * | 2/2001 | Lee | A01G 9/083 47/9 |
| 6,393,761 B1 * | 5/2002 | Deacon | A01G 5/06 47/58.1 CF |
| 7,055,282 B2 * | 6/2006 | Bryan, III | A01G 9/022 47/62 R |
| 7,627,982 B2 * | 12/2009 | Beasley | A01G 9/122 47/48.5 |
| 9,228,737 B2 * | 1/2016 | Steinmann | F21V 35/00 |
| 10,765,071 B2 * | 9/2020 | Bottari | A01G 13/28 |
| 10,820,534 B2 * | 11/2020 | Shaffer | A01G 9/029 |
| 2004/0068925 A1 * | 4/2004 | Puspurs | A01G 9/12 47/45 |
| 2006/0083802 A1 * | 4/2006 | Wang | A01G 7/06 425/2 |
| 2008/0209802 A1 * | 9/2008 | Williams | A01G 29/00 47/47 |
| 2009/0217578 A1 * | 9/2009 | Beasley | A01G 9/122 47/47 |
| 2017/0181385 A1 * | 6/2017 | Daniel | A01G 9/12 |
| 2022/0071104 A1 * | 3/2022 | Cheng | F16B 7/182 |
| 2022/0369572 A1 * | 11/2022 | Zhang | A01G 9/122 |
| 2023/0049740 A1 * | 2/2023 | Xiao | A01G 9/00 |
| 2024/0196823 A1 * | 6/2024 | Rouxel | A01G 9/022 |

* cited by examiner

PLANTING COLUMN

BACKGROUND OF THE INVENTION

1. Field of the Invention

The present invention relates to gardening supplies and more particularly, to a planting column.

2. Description of the Related Art

Climbing plants has a characteristic of growing in a climbing manner, thereby usually planted by adopting fern boards to serve as fixtures for climbing. The advantages of breathability and water retention of the fern boards allow aerial roots of climbing plants to go deep into the fern boards for fixing. However, fern boards are expensive and easily damaged, thereby requiring frequent replacement, bringing inconvenience for use.

To resolve the above-mentioned problems, China Patent Publication No. CN215957369U disclosed a combined climbing rod, which has an insertion section and a connecting section. The insertion section is a hollow shaft, and the shaft is provided at two ends thereof with a closed insertion part and a female interface respectively. The connecting section is a hollow shaft, and the shaft is provided at two ends thereof with a male interface and a female interface respectively, which are open. In practical use, the insertion part of the insertion section is inserted into the soil for fixing, and the female interface of the insertion section is connected with the male interface of the connecting section for the increase of the overall height. Because the shafts of the insertion section and the connecting section are both made of plastics, the shafts are filled with water-retaining media such as sphagnum moss, coir or coconut velvet, such that the use time is prolonged and the replacement of the media is relatively easier.

However, two ends of the shaft of the connecting section are both opening-shaped. When dividing the climbing plant for ramet, the user has to apply a force to detach the connecting section from the insertion section, resulting in that the climbing plant is liable to come off together with the medium filled in the shaft, that makes the ramet for the climbing plant quite inconvenient. Therefore, the combined climbing rod disclosed in the aforementioned patent still needs structural improvement.

In another aspect, when the plant is planted in the soil, the poor water permeability of the soil is liable to cause the root of the plant to rot away, and the poor breathability of the soil is liable to cause the root of the plant oxygen lack and necrosis.

To resolve the above-mentioned problems, the common manner is inserting a plurality of aeration tubes in the soil to improve the breathability and water permeability of the soil. The conventional aeration tube has a tube body. The tube body has an accommodating space, and a plurality of through holes communicating the accommodating space with the outside. Each through hole has an inner opening close to the accommodating space, and an outer opening opposite to the inner opening. In practical use, the user fills the accommodating space of the tube body with a medium, such as sphagnum moss, coir or expanded clay aggregate, and inserts a part of the tube body into the soil. At this time, the inner opening of each through hole is blocked by the medium, and the outer opening of each through hole is blocked by the soil, so that after the outside water or air enters the aeration tube, it cannot favorably flow through the through holes from the accommodating space of the aeration tube to permeate into the soil for the root of the plant to adsorb the water or air, resulting in that the conventional aeration tube is not ideal in terms of practicality. Therefore, the conventional aeration tube still needs improvement in terms of practicality.

To resolve the above-mentioned problem of the poor water permeability and breathability of the soil, China Patent Publication No. 208446210 disclosed a planting structure for improving big tree transplanting survival rate, which includes a plant hole and a big tree. The root of the big tree is implanted in the plant hole, and soil is filled around the root. A plurality of aeration tubes are disposed in the plant hole. An end of each aeration tube is inserted into the soil and close to the root, and the other end thereof extends out of the soil. Each aeration tube includes an outer pipe, and an inner pipe disposed in the outer pipe in an abutted and coaxial manner, and rotatable with respect to the outer pipe. The pipe wall of the outer pipe has a plurality of outer holes. The pipe wall of the inner pipe has a fixture block and a plurality of inner holes. In practical use, the user stirs the fixture block to rotate the inner pipe with respect to the outer pipe. When the inner pipe is rotated to the status that the inner pipe and the outer pipe communicate with each other, the water and oxygen in the soil can pass the inner holes of the inner pipe and the outer holes of the outer pipe, so that the water permeability and breathability of the soil is improved and thereby the tree root is prevented from rot or oxygen lack.

However, although the aeration tube provided in the aforementioned patent helps for improving the water permeability and breathability of the soil, the aeration tube is not provided with other fittings, such as a planting column or a drain head, for being substituted by the user to satisfy the requirement of the user, thereby not ideal in terms of practicality.

SUMMARY OF THE INVENTION

The present invention has been accomplished in view of the above-noted circumstances. It is a primary objective of the present invention to provide a planting column which can resolve at least one of the above-mentioned problems.

To attain the above primary objective, the present invention provides a planting column which includes a hollow pillar. The hollow pillar includes an upper end portion, a lower end portion, a body portion located between the upper end portion and the lower end portion, and an accommodating chamber located in the body portion. The upper end portion includes a top opening communicating with the accommodating chamber. The body portion includes a plurality of through holes, and the through holes of the body portion communicate the accommodating chamber with the outside of the hollow pillar. The lower end portion includes an inner surface opposite to the top opening, an outer surface, and at least one through hole penetrating through the inner surface and the outer surface. The through hole of the lower end portion communicates the accommodating chamber with the outside of the hollow pillar.

By the above-described technical features, the present invention can be a planting column for a climbing plant to climb thereon. The user can insert the lower end portion of the hollow pillar into the soil, and fill the accommodating chamber with a medium, such as sphagnum moss, coir or expanded clay aggregate, so that the aerial root of the climbing plant can go deep into the through holes of the body portion of the hollow pillar to adsorb water and nutrients. As a result, the structure of the planting column of the present invention is beneficial for the climbing plant to grow and climb thereon.

Preferably, the accommodating chamber of the hollow pillar is filled with a medium, and the medium is stopped by the inner surface of the lower end portion, such that the medium will not slip out from the accommodating chamber of the hollow pillar.

The planting column of the present invention is adjustable, according to the growth height of the climbing plant, in amount of the aforementioned hollow pillar for assembly. In other words, the planting column of the present invention may include at least two aforementioned hollow pillars connected with each other. The lower end portion of one of the hollow pillars is detachably connected to the upper end portion of another of the hollow pillars. The lower end portion of the hollow pillar has a bottom opposite to the top opening, and the bottom includes the aforementioned inner surface, outer surface and through hole. The growth of the taproot of the climbing plant is blocked by the bottom, so that the growth scope of the taproot is restricted. When the ramet for the climbing plant is required, it is easy for the user to detach one of the hollow pillars from the planting column of the present invention, and the medium filled in the accommodating chamber, such as sphagnum moss, coir or expanded clay aggregate, is stopped by the bottom of the lower end portion of the hollow pillar from coming off from the accommodating chamber. As a result, the structure of the planting column of the present invention helps for the ramet for the climbing plant.

The planting column of the present invention may be an assembly of two different kinds of hollow pillars, including a first hollow pillar and a second hollow pillar. The upper end portion of the first hollow pillar has a placement chamber communicating with the top opening of the first hollow pillar. The accommodating chamber in the body portion of the first hollow pillar communicates with the placement chamber. The lower end portion of the second hollow pillar is detachably accommodated in the placement chamber of the first hollow pillar.

As a result, the second hollow pillar can be the above-described hollow pillar whose accommodating chamber is filled with the medium, thereby beneficial for the climbing plant to grow and climb. The first hollow pillar can be an insertion member capable of being directly inserted into the soil. In this way, the first hollow pillar enables the planting column to be inserted into the soil conveniently and firmly. Besides, the first hollow pillar can improve the water permeability and breathability of the soil, so as to increase the practicability of the planting column of the present invention and increase the survival rate of the plant.

Preferably, the lower end portion of the first hollow pillar is taper in shape for being inserted into the soil even more firmly. The accommodating chamber of the second hollow pillar is filled with a medium. The medium is stopped by the inner surface of the lower end portion of the second hollow pillar, thereby prevented from coming off from the accommodating chamber.

Preferably, the upper end portion includes an inner circumferential surface, and a positioning groove located on the inner circumferential surface. The lower end portion includes an outer circumferential surface, and a positioning rib located on the outer circumferential surface and matchable with the positioning groove, so that the positioning rib of the lower end portion of the hollow pillar is insertable in the positioning groove of the upper end portion of another hollow pillar.

As a result, no matter two hollow pillars both for the plant to climb thereon are connected with each other or the aforementioned different first and second hollow pillars are connected with each other, the positioning rib of the upper hollow pillar can be embedded in the positioning groove of the lower hollow pillar to make the lower end portion of the upper hollow pillar firmly accommodated in the upper end portion of the lower hollow pillar.

More preferably, the positioning groove has a vertical section extending in the axial direction of the upper end portion, and a transverse section extending in the chord direction of the upper end portion. The transverse section communicates with the vertical section, and the transverse section has a transition region and an embedding region. A first end of the transition region communicates with the vertical section. A second end of the transition region communicates with the embedding region, and a stopping stair part is formed at the juncture of the second end and the embedding region.

As a result, the positioning rib of the upper hollow pillar can be embedded into the embedding region of the positioning groove of the lower hollow pillar through the vertical section and the transition region, so that the positioning rib is stopped by the stopping stair part, making the positioning rib less easy to slide reversely from the embedding region to the transition region, thereby improving the stability of the positioning rib.

Preferably, the planting column further includes a bottom seat. The bottom seat is detachably sleeved onto the hollow pillar. As a result, the bottom seat is beneficial for the planting column to be disposed on the surface of the soil and inserted into the soil.

More preferably, the bottom seat includes a bottom plate, and a connecting pipe extending upwardly from the bottom plate. The bottom plate has a plurality of through holes and a plurality of fastening holes. The connecting pipe is detachably sleeved onto the hollow pillar. As a result, the bottom seat is beneficial for the planting column to be fixed to the soil, and beneficial for the water permeability and the breathability.

The planting column of the present invention may be an assembly of a hollow pillar and a fitting. The upper end portion of the hollow pillar has a placement chamber communicating with the top opening. The accommodating chamber in the body portion communicates with the placement chamber. The lower end portion is taper in shape. The fitting includes a plurality of through holes and a lower end portion. The lower end portion of the fitting is detachably accommodated in the placement chamber of the hollow pillar.

As a result, the hollow pillar is an insertion member as described above, enabling the planting column to be inserted into the soil conveniently and firmly, and improving the water permeability and breathability of the soil, so as to increase the practicability of the planting column of the present invention and increase the survival rate of the plant. Besides, the planting column can have different substitution in the fitting for satisfying the requirements of the user.

Preferably, the upper end portion of the hollow pillar includes an inner circumferential surface, and a positioning groove located on the inner circumferential surface. The fitting is a drain head. The drain head has an arc receiving portion connected with the lower end portion of the drain head. The lower end portion of the drain head includes an outer circumferential surface, and a positioning rib located on the outer circumferential surface and matchable with the positioning groove. The positioning rib of the drain head is embedded in the positioning groove of the hollow pillar, such that the lower end portion of the drain head is firmly accommodated in the placement chamber of the hollow pillar.

More preferably, the positioning groove has a vertical section extending in the axial direction of the upper end portion, and a transverse section extending in the chord direction of the upper end portion. The transverse section communicates with the vertical section, and the transverse section has a transition region and an embedding region. A first end of the transition region communicates with the vertical section. A second end of the transition region communicates with the embedding region, and a stopping stair part is formed at the juncture of the second end and the embedding region. The positioning rib of the drain head is embedded into the embedding region of the positioning groove of the hollow pillar through the vertical section and the transition region.

As a result, the positioning rib of the drain head is stopped by the stopping stair part of the positioning groove of the hollow pillar, making the positioning rib less easy to slide reversely from the embedding region to the transition region, thereby improving the stability of the positioning rib.

More preferably, the drain head has a cavity located in the lower end portion. The arc receiving portion has the afore-mentioned through holes, which communicate with the cavity. The cavity of the drain head communicates with the placement chamber of the hollow pillar. In this way, when the user waters the drain head from above it, water will flow into the through holes of the drain head to flow into the placement chamber through the cavity.

More preferably, the drain head has an abutting plate located between the lower end portion and the arc receiving portion. The abutting plate is abutted on the top end of the upper end portion of the hollow pillar, such that the drain head is connected with the hollow pillar even more stably.

Preferably, the upper end portion of the hollow pillar has a through hole, and the through hole has a larger radius part and a smaller radius part communicating with the larger radius part.

As a result, the through hole of the upper end portion can be configured for a water pipe to be inserted therethrough, allowing water to directly flow into the placement chamber of the hollow pillar through the water pipe. A timing control device can be further provided to control the time for water to flow into the water pipe, thereby attaining the regularly watering effect.

Preferably, the plurality of through holes of the body portion of the hollow pillar include a plurality of first through holes and a plurality of second through holes. The first through holes and the second through holes are arranged in a staggered manner, and the inner wall surface of each of the second through holes has a slope.

As a result, water, nutrients or oxygen can be conveyed into the soil relatively more comprehensively through the first and second through holes, so that the water permeability and breathability of the soil is improved.

The planting column of the present invention may be an assembly of a hollow pillar and an inner pipe. The inner pipe has an inner pipe wall, and a plurality of inner holes penetrating through the inner pipe wall. The inner pipe is detachably fixed in the accommodating chamber of the hollow pillar, so that an accommodating space is formed between an outer surface of the inner pipe wall and an inner surface of the body portion of the hollow pillar.

As a result, the planting column with the inner pipe detachably fixed in the hollow pillar can convey water and oxygen into the soil through the inner holes of the inner pipe and the through holes of the body portion of the hollow pillar, so as to improve the water permeability and breathability of the soil. Besides, the accommodating space formed between the inner pipe and the hollow pillar may be not filled with any medium, or can be filled with different kinds of media, such as soil, foamed gravel, sphagnum moss or coir, so that the planting column of the present invention has even wider usability.

Preferably, the hollow pillar includes a combining portion. The combining portion is annular in shape, and extends upwardly from the inner surface of the lower end portion. The inner pipe includes a fixing end portion. The fixing end portion of the inner pipe is fixedly inserted in the combining portion of the hollow pillar.

More preferably, the combining portion of the hollow pillar includes an inner surface, and a plurality of ribs located on the inner surface. The ribs are abutted against the fixing end portion of the inner pipe, so that the ribs and the fixing end portion are in the tightly fit status.

More preferably, each of the ribs of the combining portion of the hollow pillar has a top end and a bottom end opposite to the top end. Each of the ribs has a taper shape gradually narrowing from the top end to the bottom end. In this way, the configuration design of the ribs makes the fixing end portion of the inner pipe less easy to come off from the combining portion of the hollow pillar.

Preferably, the hollow pillar further includes an annular rib. The annular rib is provided on an outer surface of the body portion and surrounds a hollow area formed on the body portion.

As a result, the user can remove, along the annular rib, the partial hollow pillar within the annular rib to obtain a big hole for the climbing plant to stretch out through the big hole of the hollow pillar to grow.

Preferably, the hollow pillar further includes two annular ribs. The annular ribs are provided on an outer surface of the body portion and arranged as concentric circles, and a hollow area is formed between the annular ribs.

As a result, according to usage requirements, the user can remove, along one of the annular ribs, the partial hollow pillar within the annular rib to obtain a big hole for the climbing plant to stretch out through the big hole of the hollow pillar to grow.

Preferably, the planting column further includes a cover covering the top opening of the hollow pillar, so that the user can place the planting column horizontally, and the medium filled in the accommodating space is stopped by the cover from slipping out from the accommodating space.

The detailed structure, features, assembly or usage of the planting column provided by the present invention will be described in the following detailed description of embodiments. However, those skilled in the field of the present invention should understand that the detailed descriptions and specific embodiments instanced for implementing the present invention are given by way of illustration only, not intended to limit the scope of the claims of the present invention.

BRIEF DESCRIPTION OF THE DRAWINGS

FIG. 22 is an exploded perspective view of a planting column according to a fourth preferred embodiment of the present invention.

DETAILED DESCRIPTION OF THE INVENTION

Figure 1:
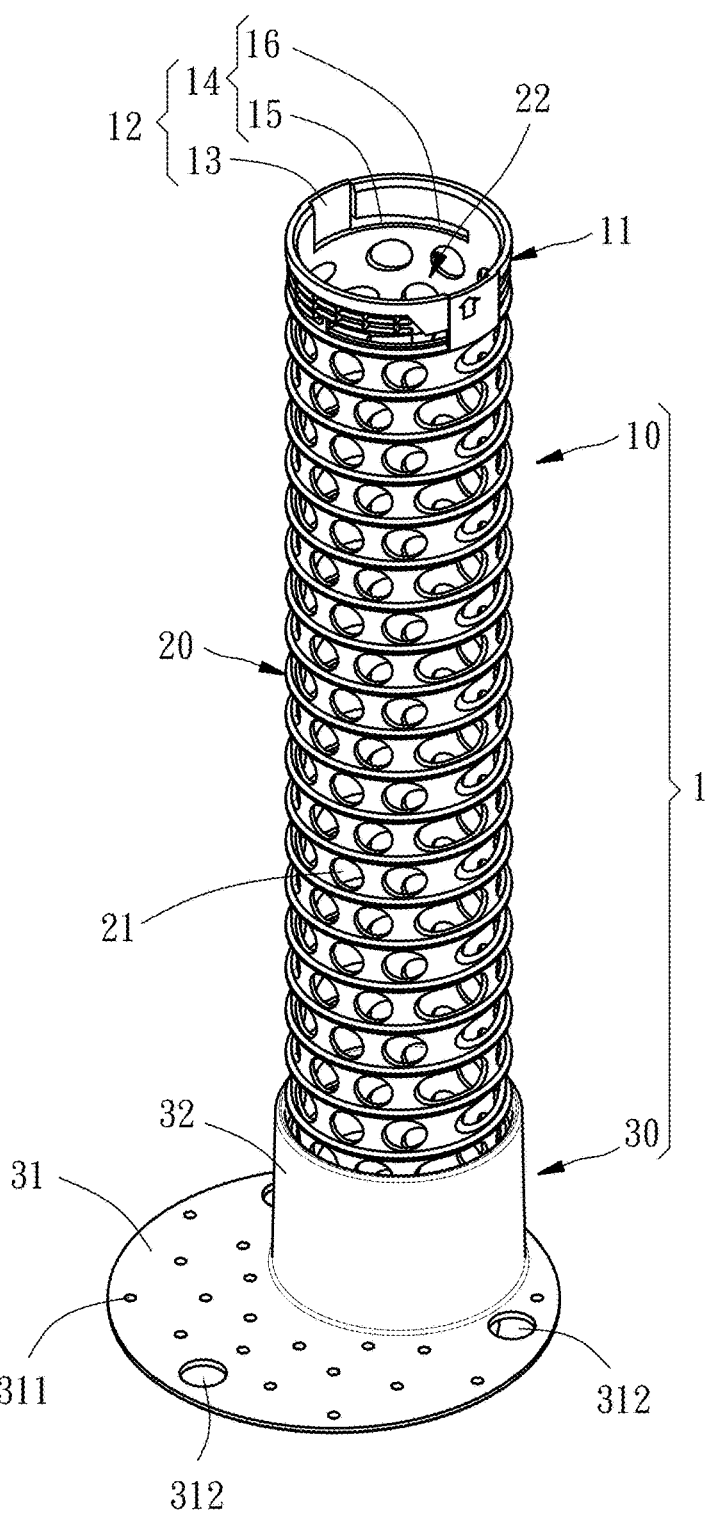
FIG. 1 is an assembled perspective view of a planting column according to a first preferred embodiment of the present invention.

First of all, it is to be mentioned that throughout this specification, including the following embodiments and claims, the directional terms are all based on the direction shown in the figures. Besides, same reference numerals used in the following embodiments and the appendix drawings designate same or similar elements or the structural features thereof.

Figure 2:
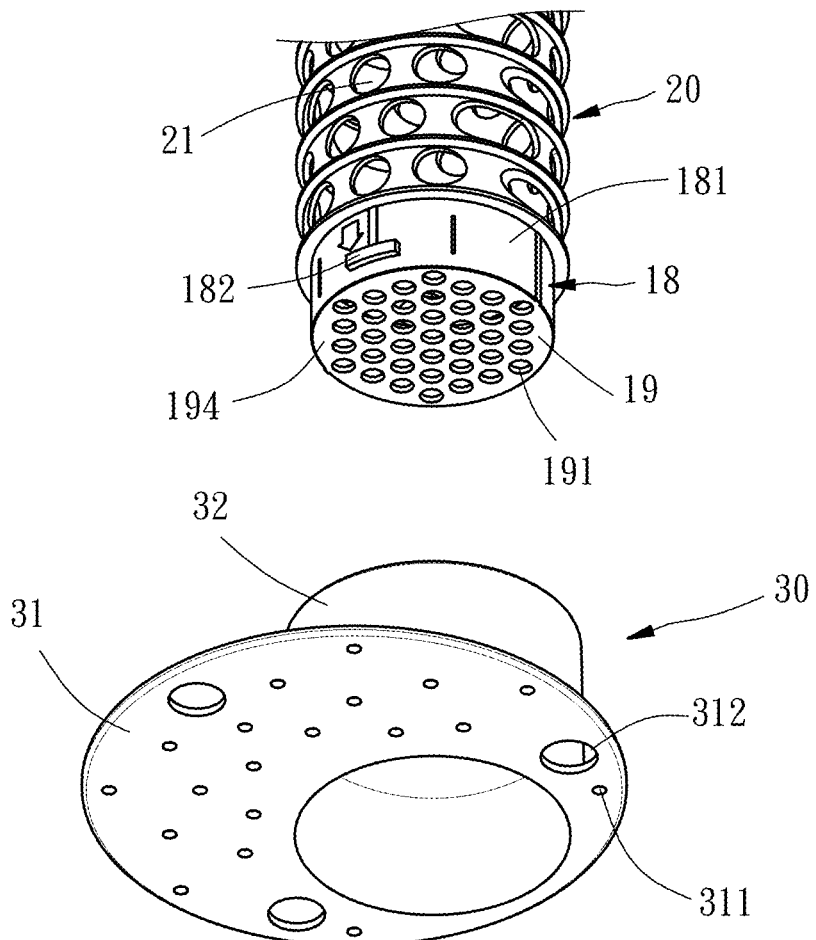
FIG. 2 is a partial exploded perspective view of the planting column according to the first preferred embodiment of the present invention.
Figure 3:
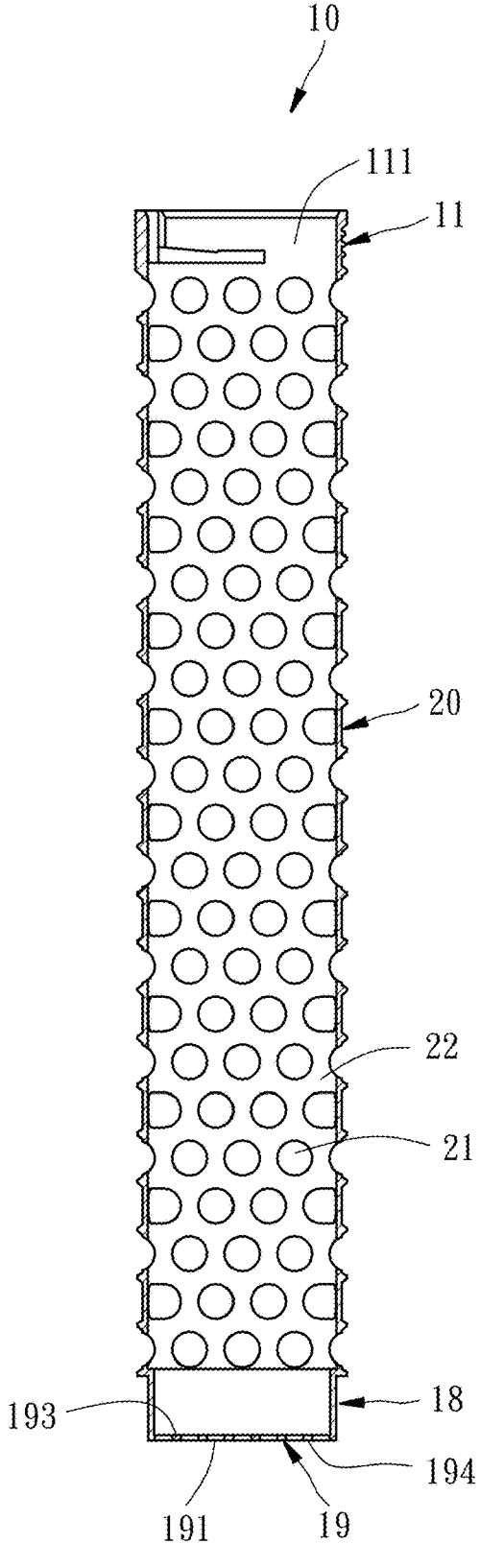
FIG. 3 is a vertical sectional view of a hollow pillar of the planting column according to the first preferred embodiment of the present invention.

Referring to FIG. 1 to FIG. 3, a planting column 1 according to a first preferred embodiment of the present invention includes a hollow pillar 10, and a bottom seat 30.

The hollow pillar 10 includes an upper end portion 11, a lower end portion 18, a body portion 20 located between the upper end portion 11 and the lower end portion 18, and an accommodating chamber 22 located in the body portion 20.

Figure 4:
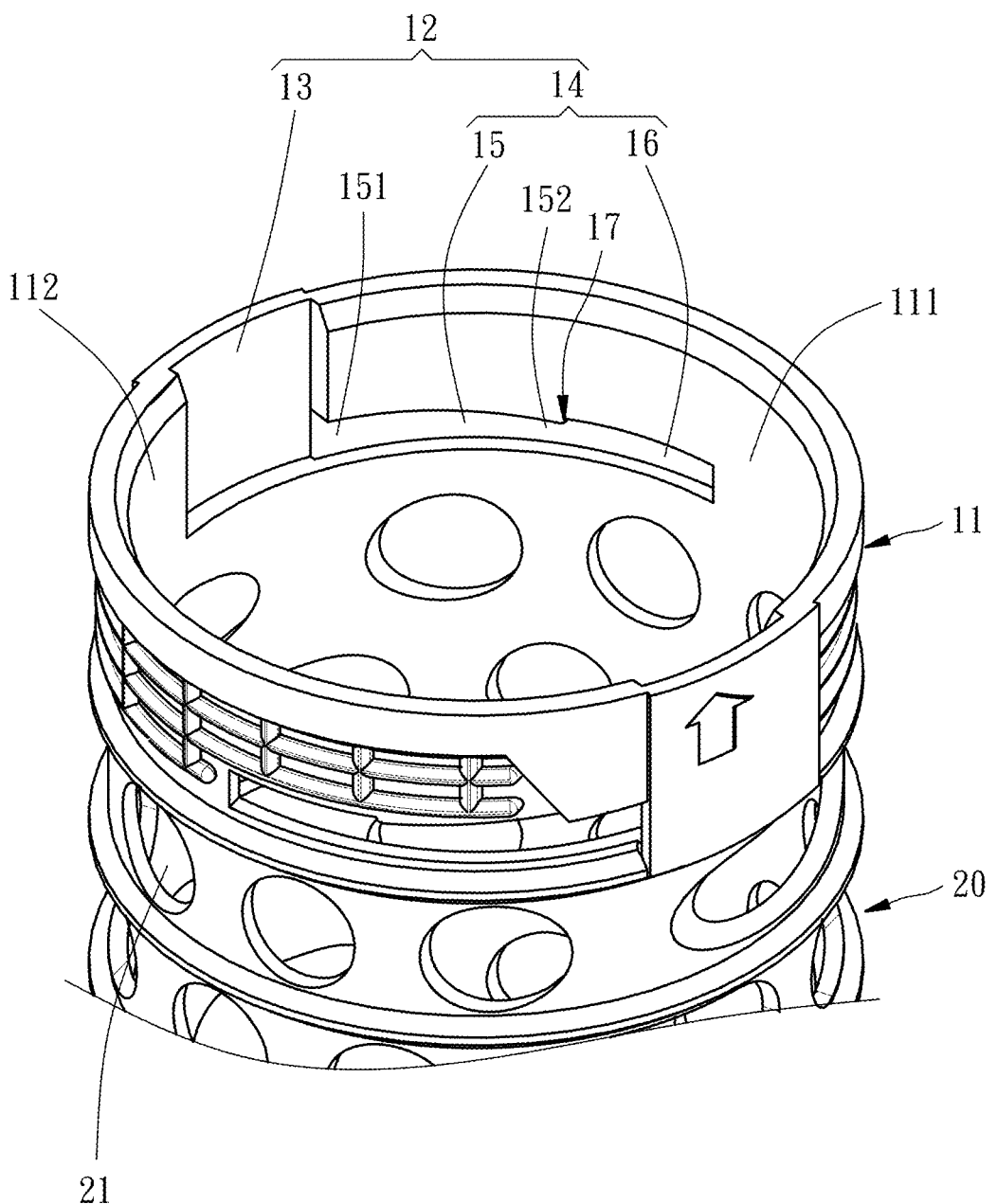
FIG. 4 is a partial perspective view of the hollow pillar of the planting column according to the first preferred embodiment of the present invention.

The upper end portion 11 has a top opening 111 communicating with the accommodating chamber 22, as shown in FIG. 3 and FIG. 4. The upper end portion 11 has an inner circumferential surface 112, and two positioning grooves 12 located on the inner circumferential surface 112 and opposite to each other. Each positioning groove 12 has a vertical section 13 and a transverse section 14, which communicate with each other. The vertical section 13 extends in the axial direction of the upper end portion 11. The transverse section 14 extends in the chord direction of the upper end portion 11. As shown in FIG. 4, the transverse section 14 has a transition region 15 and an embedding region 16. A first end 151 of the transition region 15 communicates with the vertical section 13. A second end 152 of the transition region 15 communicates with the embedding region 16, and a stopping stair part 17 is formed at the juncture of the second end 152 and the embedding region 16. As shown in FIG. 2 and FIG. 3, the lower end portion 18 has a bottom 19. The bottom 19 has an inner surface 193 opposite to the top opening 111, an outer surface 194, and a plurality of through holes 191 penetrating through the inner surface 193 and the outer surface 194. The through holes 191 communicate the accommodating chamber 22 with the outside of the hollow pillar 10. The lower end portion 18 has an outer circumferential surface 181, and two positioning ribs 182 located on the outer circumferential surface 181 and opposite to each other. The positioning ribs 182 are matched with the positioning grooves 12 of the upper end portion 11 respectively. As shown in FIG. 3, the body portion 20 has a plurality of through holes 21. The through holes 21 communicate the accommodating chamber 22 with the outside of the hollow pillar 10.

As shown in FIG. 1 and FIG. 2, the bottom seat 30 includes a bottom plate 31, and a connecting pipe 32 extending upwardly from the bottom plate 31. The bottom plate 31 has a plurality of through holes 311 and three fastening holes 312. The amount of the fastening hole 312 is three in this embodiment, but unlimited to three in practice. The connecting pipe 32 is detachably sleeved onto the lower end portion 18 of the hollow pillar 10. The structure of the bottom seat 30 is unlimited to that disclosed in the present invention. For example, the bottom plate 31 of the bottom seat 30 doesn't include the aforementioned three fastening holes 312, but has a plurality of protruding ribs (not shown) extending from the bottom of the bottom plate 31.

Figure 5:
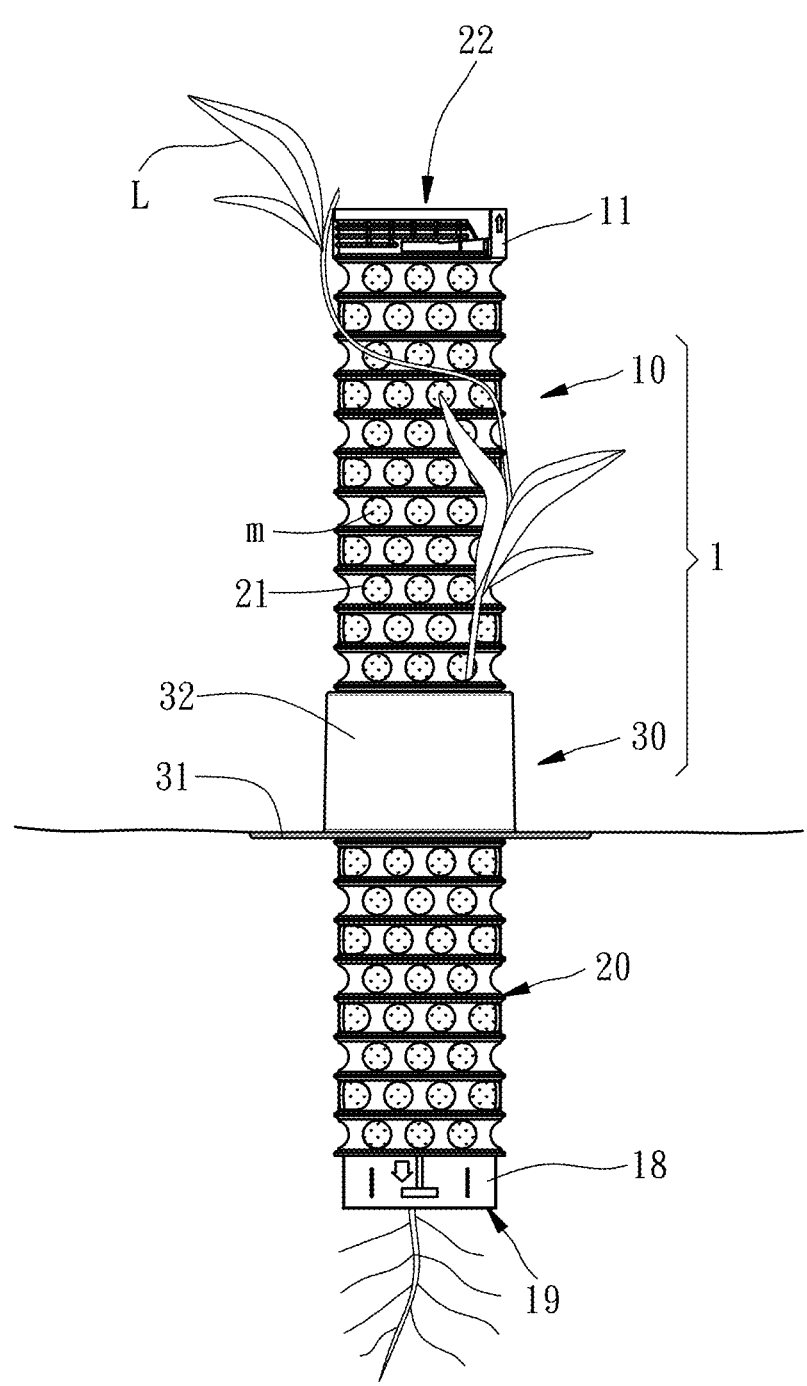
FIG. 5 is a schematic view showing that a lower end portion of the hollow pillar of the planting column according to the first preferred embodiment of the present invention is inserted in the soil.

Referring to FIG. 5, when the planting column 1 of the first embodiment of the present invention is practically in use, the user firstly fills the accommodating chamber 22 of the hollow pillar 10 with a medium m, such as sphagnum moss, coir or expanded clay aggregate, then attaches the bottom plate 31 of the bottom seat 30 to the surface of the soil, and inserts three fasteners, such as screws or wood sticks, into the fastening holes 312 of the bottom plate 31 as shown in FIG. 1 respectively or directly inserts the aforementioned protruding ribs of the bottom of the bottom plate 31 of the bottom seat 30 into the soil, so that the bottom seat 30 is firmly supported on the surface of the soil. After that, the lower end portion 18 of the hollow pillar 10 is inserted into the connecting pipe 32 of the bottom seat 30, and the hollow pillar 10 is slidden downwardly with respect to the bottom seat 30 so that the lower end portion 18 of the hollow pillar 10 and a part of the body portion 20 are inserted in the soil. It should be additionally mentioned here that the bottom seat 30 can be entirely embedded in the soil, and the depth of downwardly sliding the hollow pillar 10 with respect to the bottom seat 30 can be adjusted by the user according to the requirement of the user. Alternatively, the aforementioned hollow pillar 10 may not be slidden downwardly with respect to the bottom seat 30. In other words, the bottom seat 30 can be sleeved onto the lower end portion 18 or the body portion 20 of the hollow pillar 10. When the user waters the hollow pillar 10 from above it, water will be absorbed by the medium m in the accommodating chamber 22. After the medium m absorbs water from top to bottom and becomes saturated, water will seep out of the hollow pillar 10 through the through holes 21 of the body portion 20, the through holes 191 of the bottom 19 of the lower end portion 18 (as shown in FIG. 2), and the through holes 311 of the bottom plate 31 of the bottom seat 30 (as shown in FIG. 2). Besides, the through holes 311 of the bottom plate 31 of the bottom seat 30 can also improve the breathability of the soil thereunder, thereby beneficial for the growth of plants. When a climbing plant L climbs on the hollow pillar 10, the aerial root of the climbing plant L can go deep into the through holes 21 of the body portion 20 to adsorb water and nutrients.

However, the planting column of the present invention is unlimited to that disclosed in this embodiment. For example, the planting column may not include the aforementioned bottom seat 30. Besides, the user can insert threads or iron wires through the transverse sections 14 of the positioning grooves 12 as shown in FIG. 4, so as to hang the hollow pillar 10 on, for example, the wall, window frame or ceiling. The place for hanging the hollow pillar 10 is unlimited herein.

For matching with the growth height of the climbing plant L, the user can combine two or more than two hollow pillars 10 provided in the first embodiment of the present invention. In other words, a plurality of hollow pillars 10 can be combined into a relatively higher planting column. The amount of the hollow pillar 10 for assembly can be adjusted according to the growth height of the climbing plant L.

Figure 6:
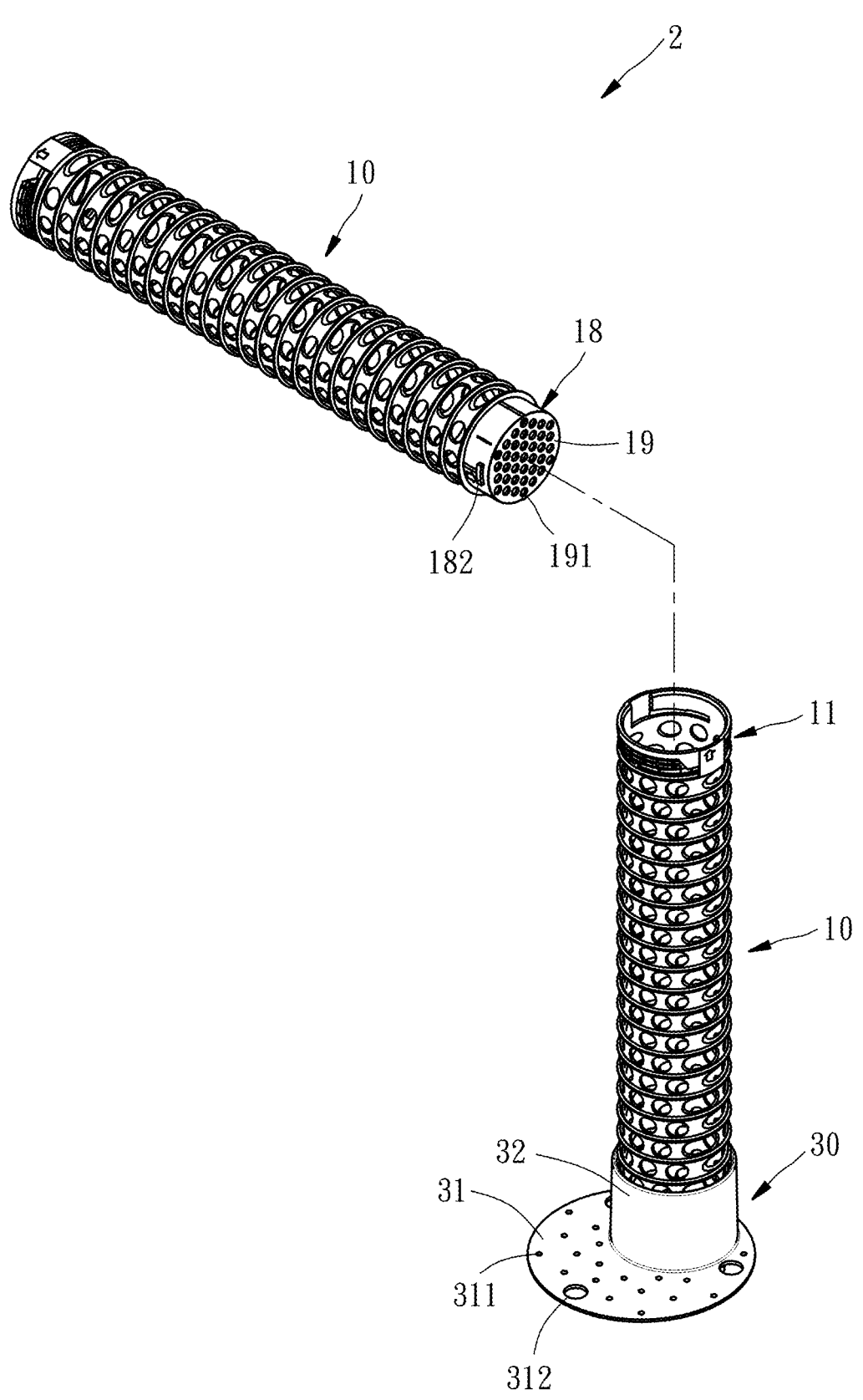
FIG. 6 is an exploded perspective view of a planting column according to a second preferred embodiment of the present invention.
Figure 7:
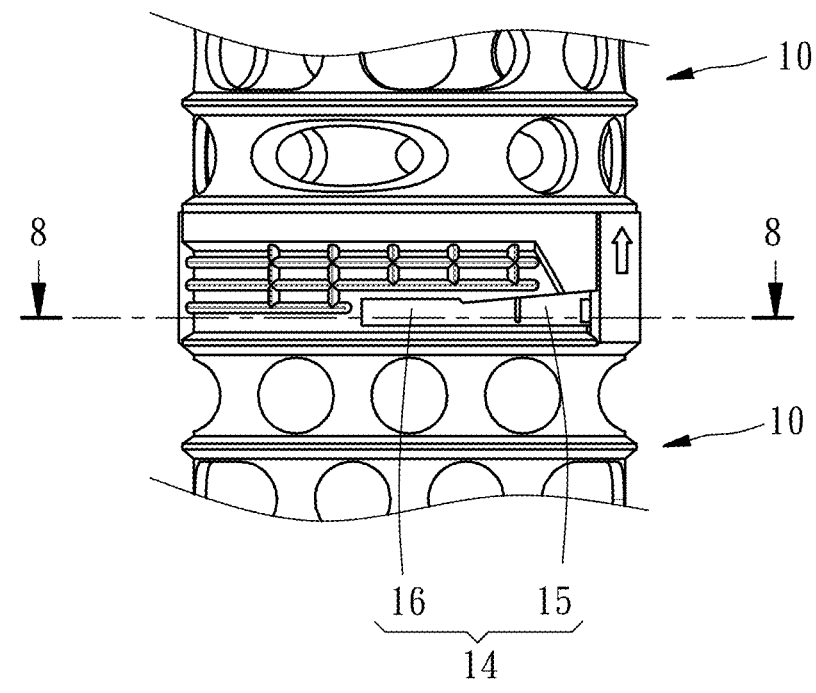
FIG. 7 is a partially enlarged view of the planting column according to the second preferred embodiment of the present invention.
Figure 8:
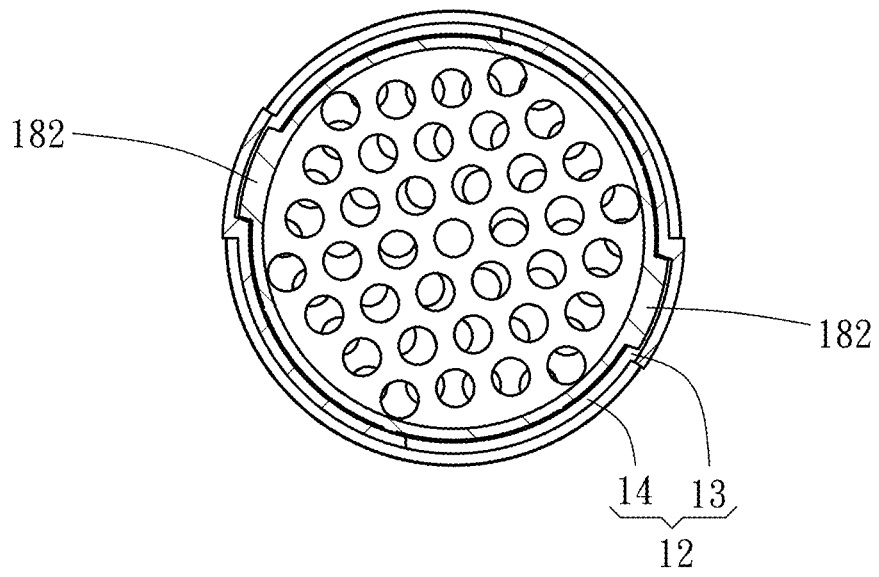
FIG. 8 is a sectional view taken along the line 8-8 in FIG. 7, showing the status that positioning ribs of an upper hollow pillar are respectively located in vertical sections of positioning grooves of a lower hollow pillar.
Figure 9:
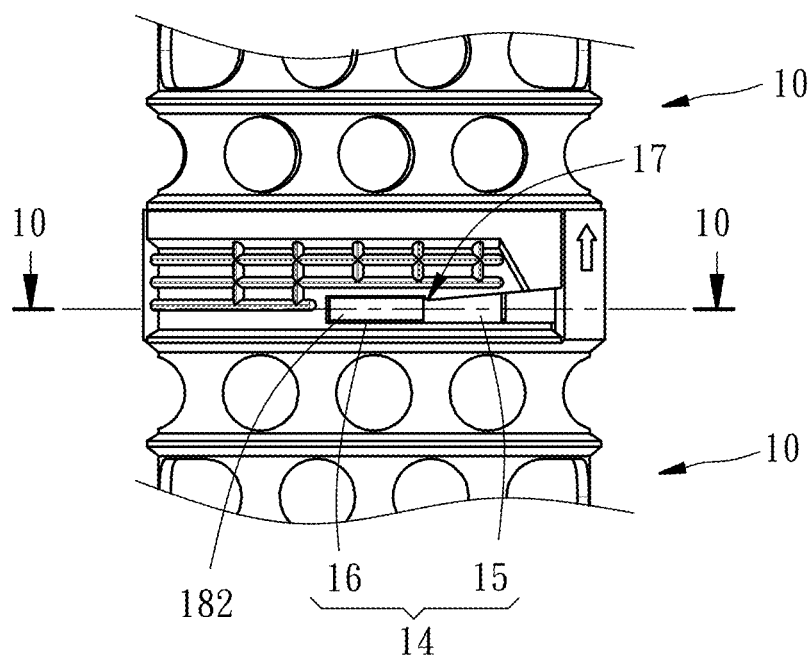
FIG. 9 is similar to FIG. 7, but showing the upper hollow pillar is rotated to the status that the positioning ribs are respectively embedded in embedding regions of transverse sections of the positioning grooves of the lower hollow pillar.
Figure 10:
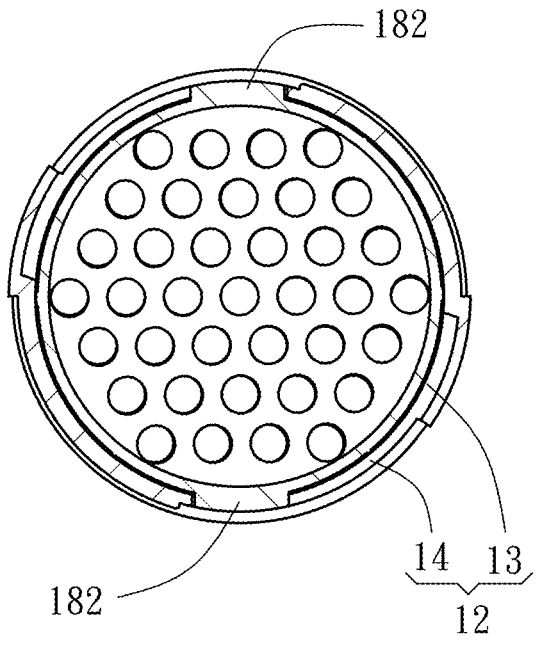
FIG. 10 is a sectional view taken along the line 10-10 in FIG. 9.

Referring to FIG. 6, a planting column 2 according to a second preferred embodiment of the present invention includes two hollow pillars 10 as described in the first preferred embodiment. When the two hollow pillars 10 are connected together, the lower end portion 18 of the upper hollow pillar 10 is inserted in the upper end portion 11 of the lower hollow pillar 10. Further speaking, as shown in FIG. 7 and FIG. 8, the positioning ribs 182 of the upper hollow pillar 10 are respectively slidden downwardly along the vertical sections 13 of the positioning grooves 12 of the lower hollow pillar 10, so that the positioning ribs 182 are respectively located in the vertical sections 13 of the positioning grooves 12. Then, as shown in FIG. 9 and FIG. 10, the upper hollow pillar 10 is rotated so that the positioning ribs 182 are gradually moved from the vertical sections 13 to the transverse sections 14 of the positioning grooves 12 respectively, and guided by the transition regions 15 of the transverse sections 14 during the movement, thereby gradually moved to the embedding regions 16. At this time, the positioning ribs 182 are stopped by the stopping stair parts 17 respectively, that makes the positioning ribs 182 less easy to slide reversely from the embedding regions 16 to the transition regions 15, so that the positioning ribs 182 are firmly embedded in the embedding regions 16 of the positioning grooves 12. At this time, the two hollow pillars 10 are firmly connected together. After that, as shown in FIG. 6, the connecting pipe 32 of the bottom seat 30 is sleeved onto the lower end portion 18 of the lower hollow pillar 10, such that the assembly of the planting column 2 including two hollow pillars 10 is accomplished. Besides, if the user wants to separate the upper hollow pillar 10 from the lower hollow pillar 10, the user only needs to perform the above-described process reversely.

Figure 11:
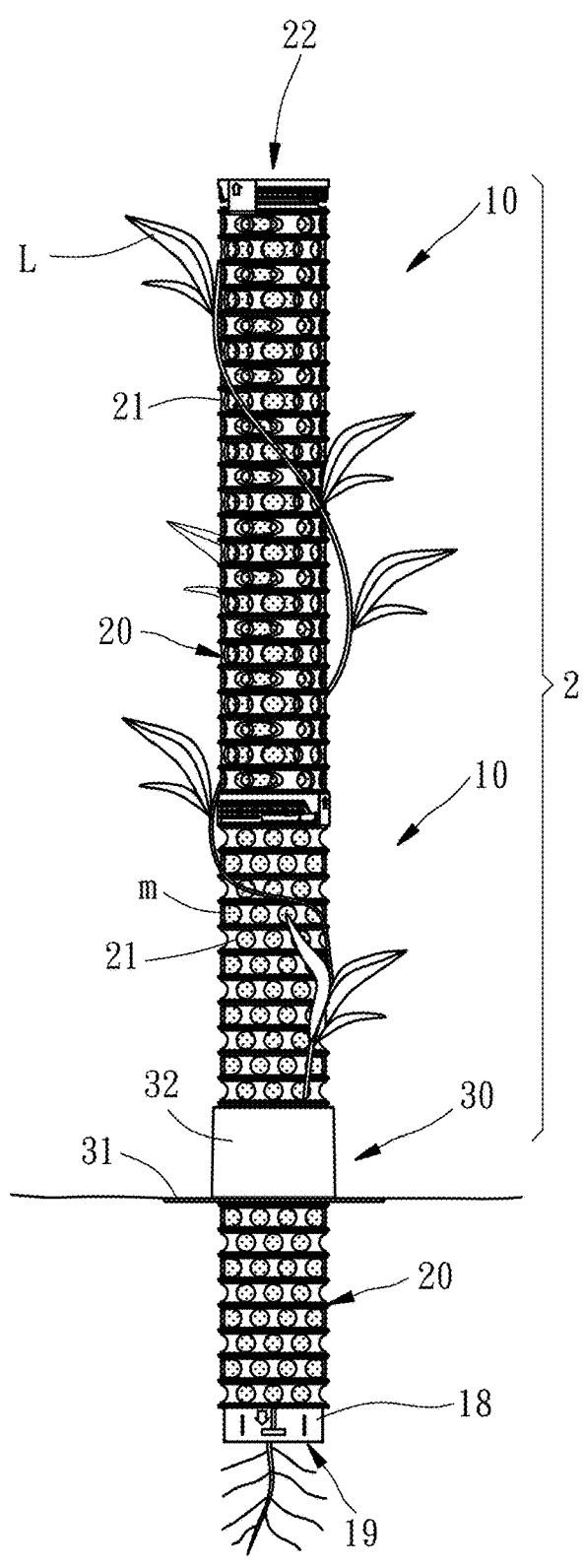
FIG. 11 is a schematic view showing that the lower end portion of the lower hollow pillar of the planting column according to the second preferred embodiment of the present invention is inserted in the soil.
Figure 12:
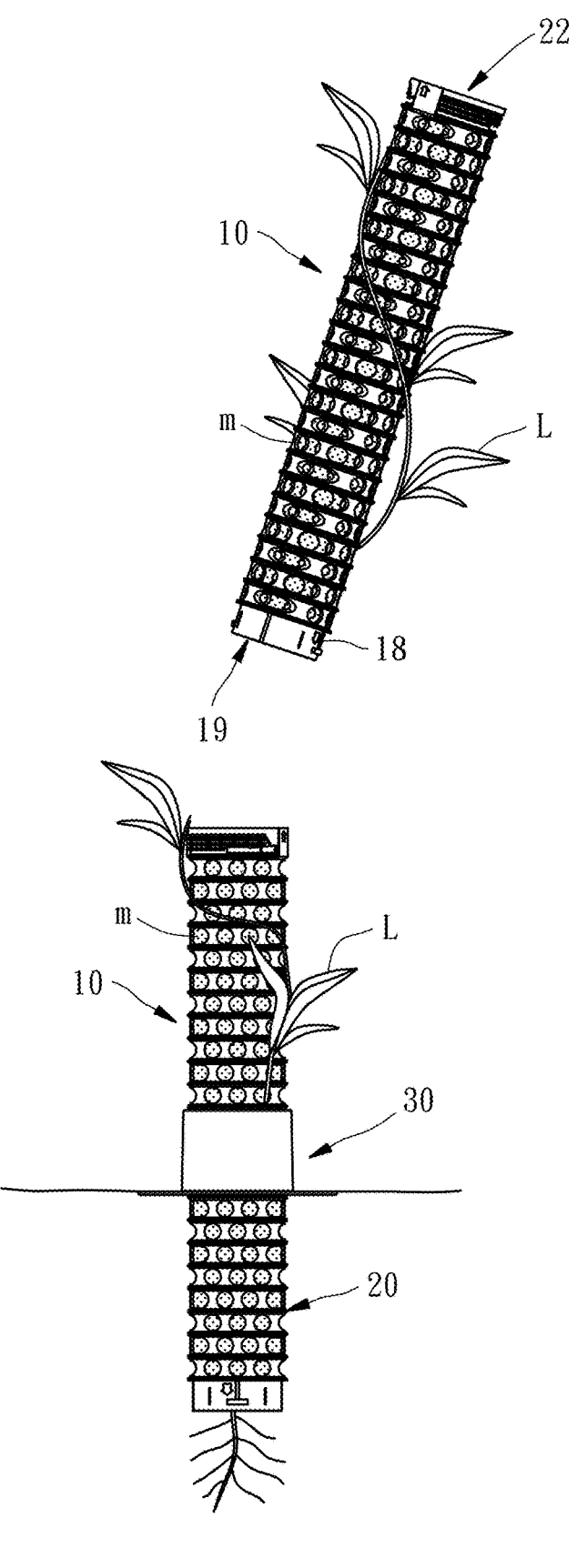
FIG. 12 is similar to FIG. 11, but showing the status that the upper hollow pillar is separated from the lower hollow pillar.

As shown in FIG. 11, when the planting column 2 in this embodiment is practically in use, the user firstly fills each of the accommodating chambers 22 of the two hollow pillars 10 with a medium m, such as sphagnum moss, coir or expanded clay aggregate, then performs the above-described process to connect the two hollow pillars 10 together, then attaches the bottom plate 31 of the bottom seat 30 to the surface of the soil, and inserts three fasteners, such as screws or wood sticks, into the fastening holes 312 of the bottom plate 31 as shown in FIG. 6 respectively or directly inserts the protruding ribs of the bottom of the bottom plate 31 of the bottom seat 30 as described in the first preferred embodiment into the soil for fixing, so that the bottom seat 30 is firmly supported on the surface of the soil. After that, the lower end portion 18 of the lower hollow pillar 10 is inserted into the connecting pipe 32 of the bottom seat 30, and the two hollow pillars 10 are slidden downwardly together with respect to the bottom seat 30 so that the lower end portion 18 and a part of the body portion 20 of the lower hollow pillar 10 are inserted in the soil. It should be additionally mentioned here that the bottom seat 30 can be entirely embedded in the soil, and the depth of downwardly sliding the aforementioned two hollow pillars 10 together with respect to the bottom seat 30 can be adjusted by the user according to the requirement of the user. Alternatively, the aforementioned two hollow pillars 10 may not be slidden downwardly with respect to the bottom seat 30. When the user waters the climbing plant L from above it, water will be absorbed by the media m in the accommodating chambers 22. After the media m absorb water from top to bottom and become saturated, water will seep out of the two hollow pillars 10 through the through holes 21 of the body portions 20, the through holes 191 of the bottoms 19 of the lower end portions 18 (as shown in FIG. 6), and the through holes 311 of the bottom plate 31 of the bottom seat 30 (as shown in FIG. 6). In addition, when the climbing plant L climbs on the two hollow pillars 10, the aerial root of the climbing plant L can go deep into the through holes 21 of the body portions 20 to adsorb water and nutrients. As shown in FIG. 12, when the user divides the climbing plant L for ramet, because the taproot of the climbing plant L is blocked by the bottom 19 of the lower end portion 18 of the upper hollow pillar 10, the growth scope of the taproot is restricted, so that the climbing plant L on the lower hollow pillar 10 will not be affected. Besides, the medium m filled in the accommodating chamber 22 is also stopped by the bottom 19 of the lower end portion 18 of the upper hollow pillar 10 from coming off from the accommodating chamber 22. Therefore, the user can easily divide the climbing plant L for ramet only by separating the upper hollow pillar 10 from the lower hollow pillar 10.

Figure 13:
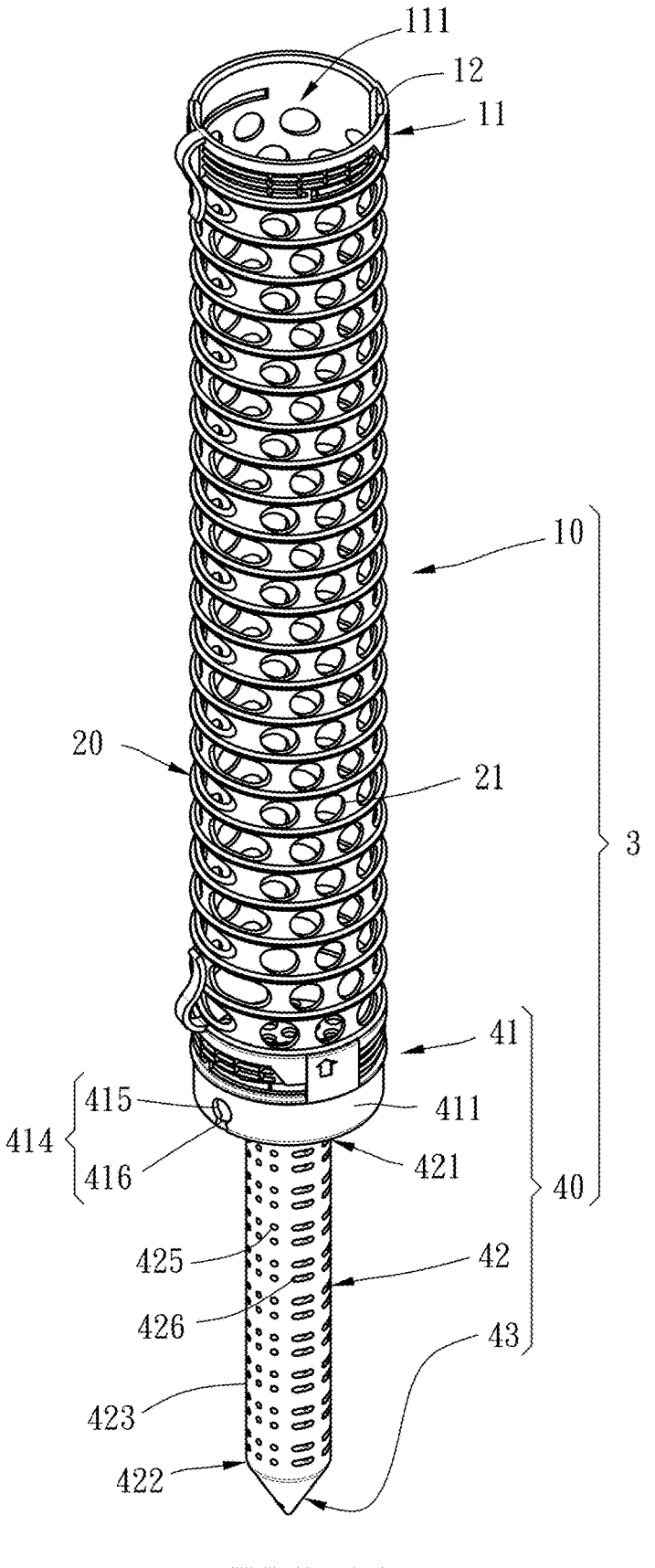
FIG. 13 is an assembled perspective view of a planting column according to a third preferred embodiment of the present invention.
Figure 14:
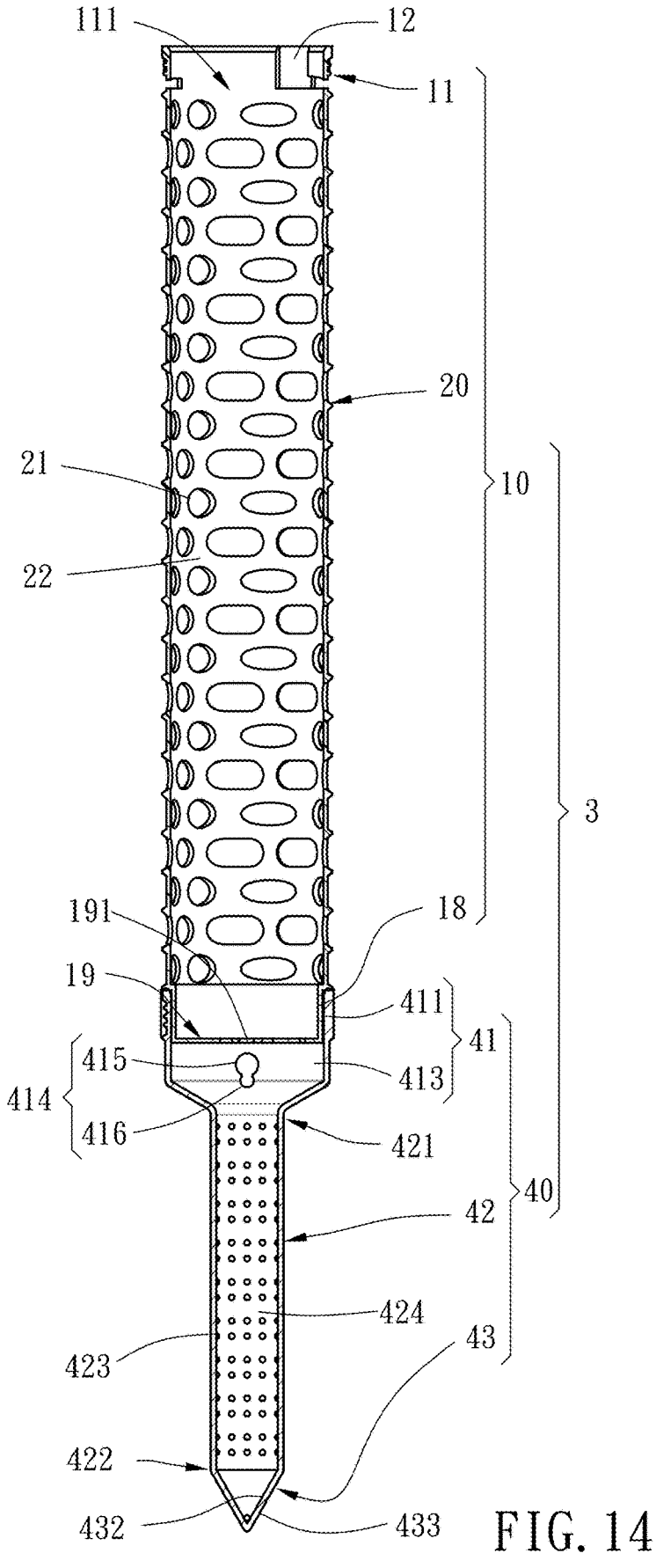
FIG. 14 is a vertical sectional view of the planting column according to the third preferred embodiment of the present invention.
Figure 15:
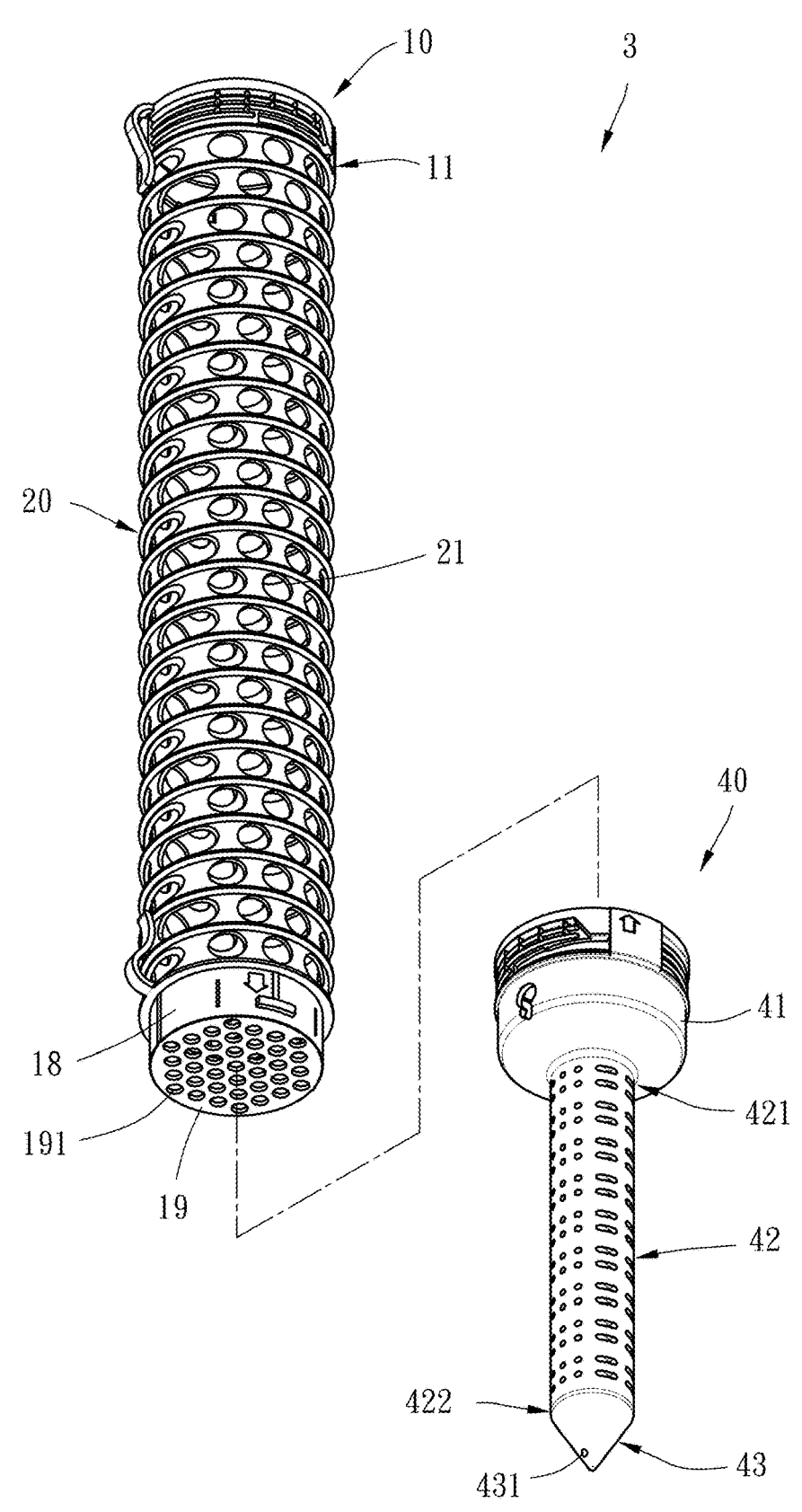
FIG. 15 is an exploded perspective view of the planting column according to the third preferred embodiment of the present invention.

Referring to FIG. 13 to FIG. 15, a planting column 3 according to a third preferred embodiment of the present invention includes two different hollow pillars 10 and 40, wherein the hollow pillar 10 is similar to that described in the first and second preferred embodiments, thereby not repeatedly described hereinafter. The hollow pillar 40 not only has similar structural features to the hollow pillar 10, but is also an insertion member capable of being directly inserted into the soil for fixing. In the present invention, the hollow pillar 40 is also referred to as first hollow pillar, and the hollow pillar 10 is also referred to as second hollow pillar.

As shown in FIG. 13 to FIG. 15, the hollow pillar 40 includes an upper end portion 41 relatively larger in outer radius, a body portion 42 relatively smaller in outer radius, and a lower end portion 43 having a taper shape.

Figure 16:
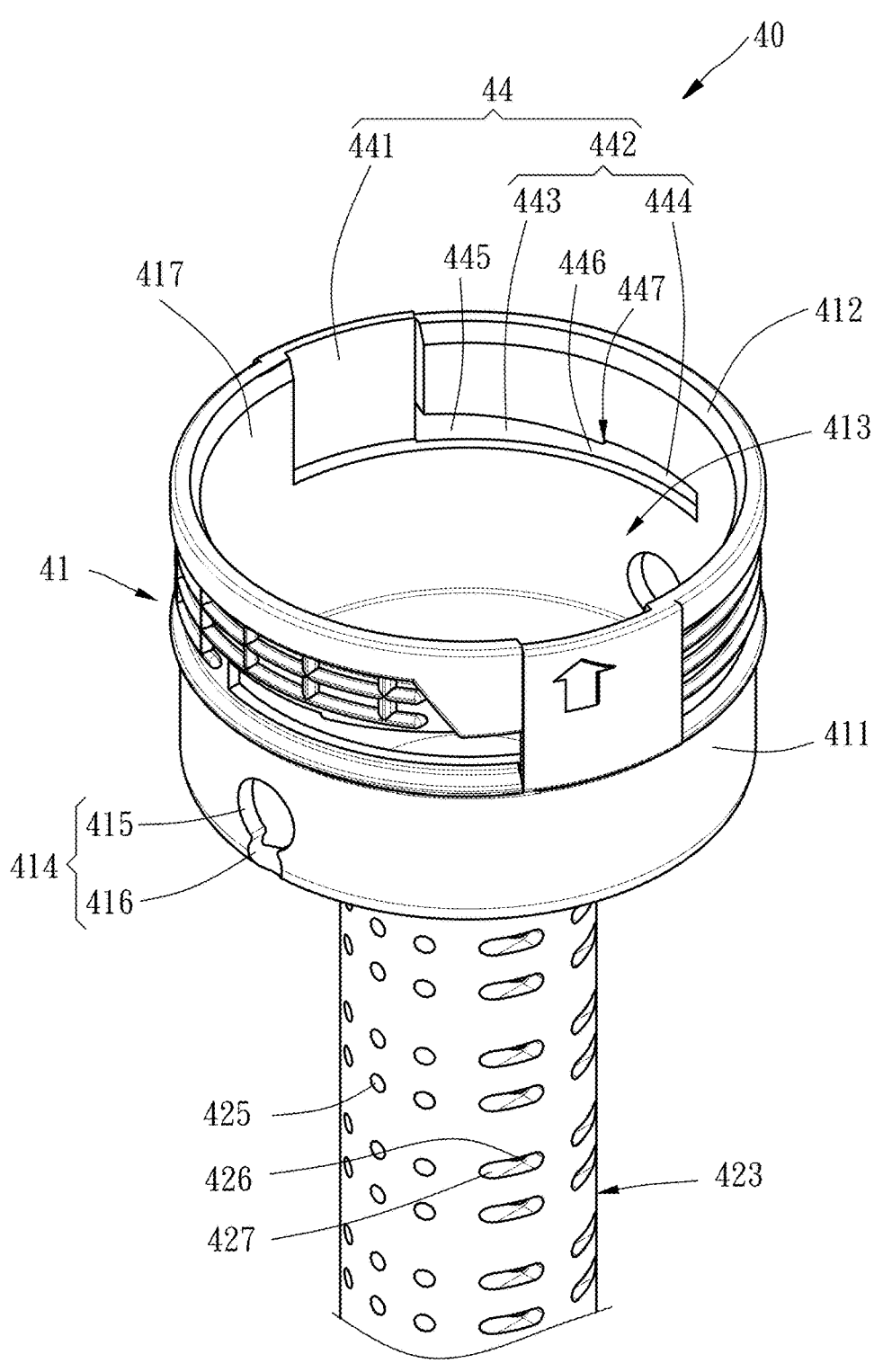
FIG. 16 is a partially enlarged view of a first hollow pillar of the planting column according to the third preferred embodiment of the present invention.

As shown in FIG. 16, the upper end portion 41 includes an annular barrel 411, a top opening 412 located at the top end of the annular barrel 411, and a placement chamber 413 located in the annular barrel 411. The placement chamber 413 communicates with the top opening 412. The annular barrel 411 has two through holes 414 opposite to each other. Each through hole 414 has a larger radius part 415 and a smaller radius part 416 communicating with the larger radius part 415. The annular barrel 411 has an inner circumferential surface 417, and two positioning grooves 44 located on the inner circumferential surface 417 and opposite to each other. Each positioning groove 44 has a vertical section 441 and a transverse section 442, which communicate with each other. The vertical section 441 extends in the axial direction of the annular barrel 411. The transverse section 442 extends in the chord direction of the annular barrel 411. The transverse section 442 has a transition region 443 and an embedding region 444. A first end 445 of the transition region 443 communicates with the vertical section 441. A second end 446 of the transition region 443 communicates with the embedding region 444, and a stopping stair part 447 is formed at the juncture the second end 446 and the embedding region 444.

As shown in FIG. 13 and FIG. 14, the body portion 42 is shaped as a tube, having an upper end 421 connected with the annular barrel 411 of the upper end portion 41, a lower end 422 opposite to the upper end 421, a tube body 423 located between the upper end 421 and the lower end 422, and an accommodating chamber 424 located in the tube body 423 and communicating with the placement chamber 413 of the upper end portion 41. The tube body 423 has a plurality of through holes, including a plurality of first through holes 425 and a plurality of second through holes 426. Each of the first and second through holes 425 and 426 communicates the accommodating chamber 424 with the outside of the hollow pillar 40. The first through holes 425 and the second through holes 426 are arranged in a parallel staggered manner, wherein each second through hole 426 is elongated in shape, and the inner wall surface of each second through hole 426 has an inclined slope 427, as shown in FIG. 16.

As shown in FIG. 13 to FIG. 15, the lower end portion 43 extends downwardly from the lower end 422 of the body portion 42 to be taper-shaped, and has two through holes 431. Specifically speaking, the lower end portion 43 includes an inner surface 432 and an outer surface 433, which have the taper shape, as shown in FIG. 14. The inner surface 432 is opposite to the top opening 412 (as shown in FIG. 16) of the upper end portion 41. The through holes 431 penetrate through the inner surface 432 and the outer surface 433. The through holes 431 communicate the accommodating chamber 424 with the outside of the hollow pillar 40.

Figure 17:
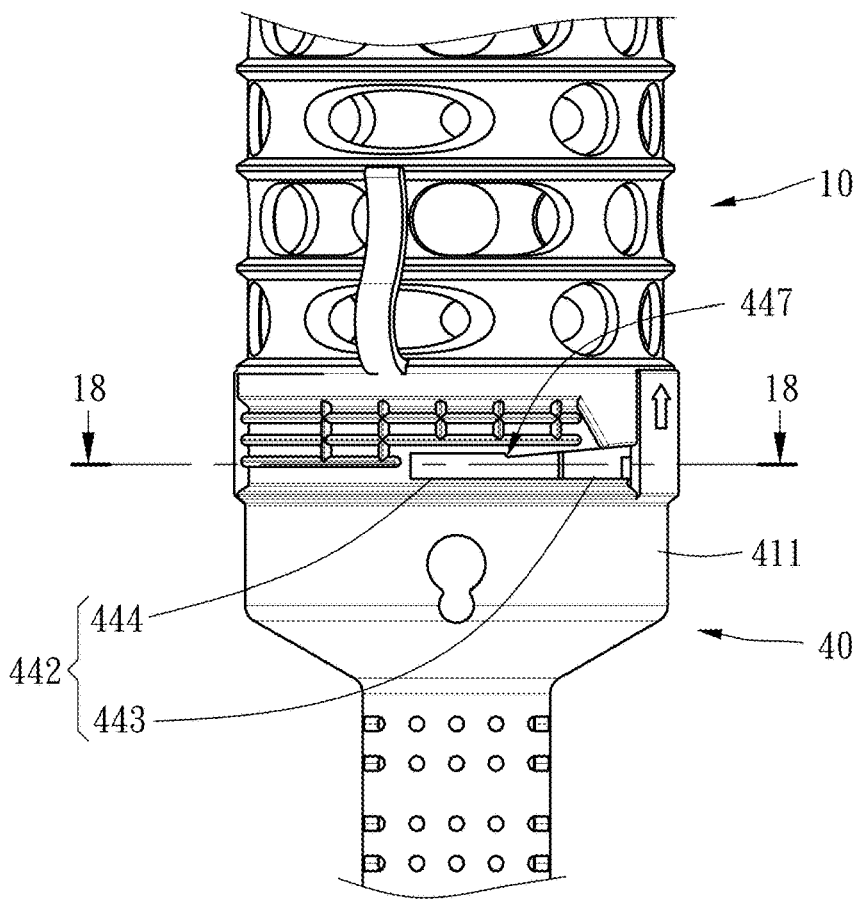
FIG. 17 is a partially enlarged view of the planting column according to the third preferred embodiment of the present invention.
Figure 18:
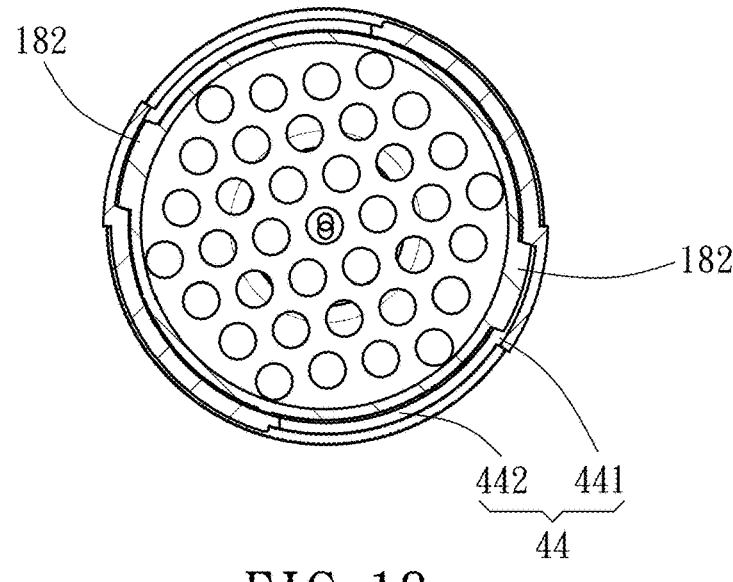
FIG. 18 is a sectional view taken along the line 18-18 in FIG. 17, showing the status that positioning ribs of a second hollow pillar of the planting column are respectively located in vertical sections of positioning grooves of the first hollow pillar.
Figure 19:
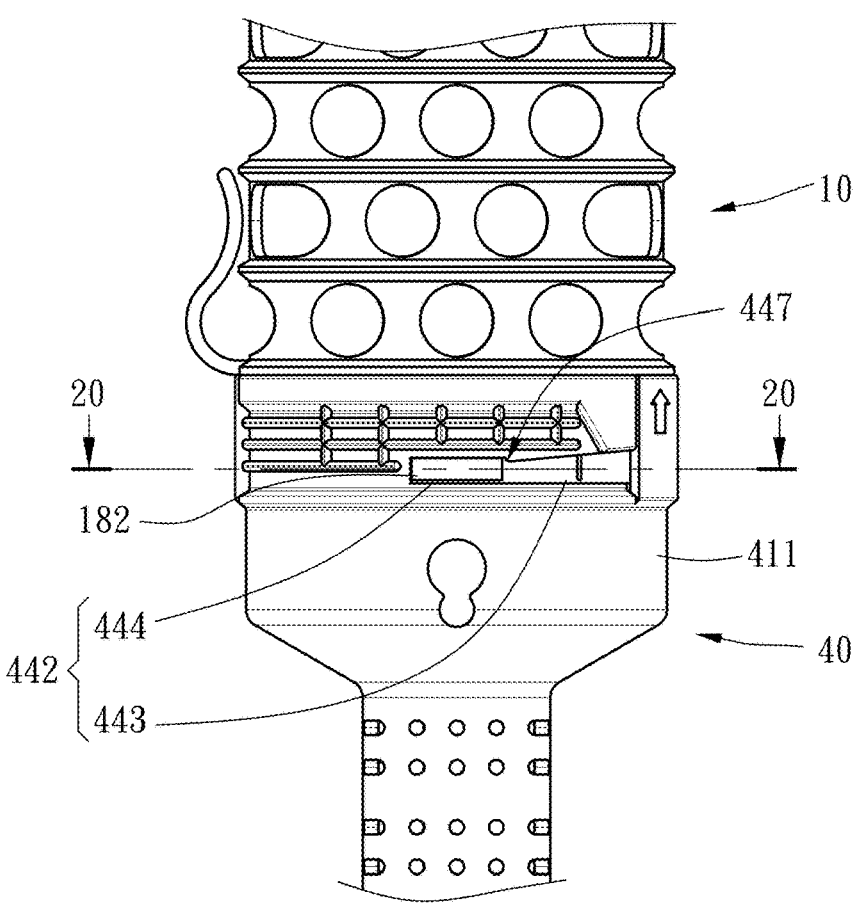
FIG. 19 is similar to FIG. 17, but showing the second hollow pillar is rotated to the status that the positioning ribs are respectively embedded in embedding regions of transverse sections of the positioning grooves of the first hollow pillar.
Figure 20:
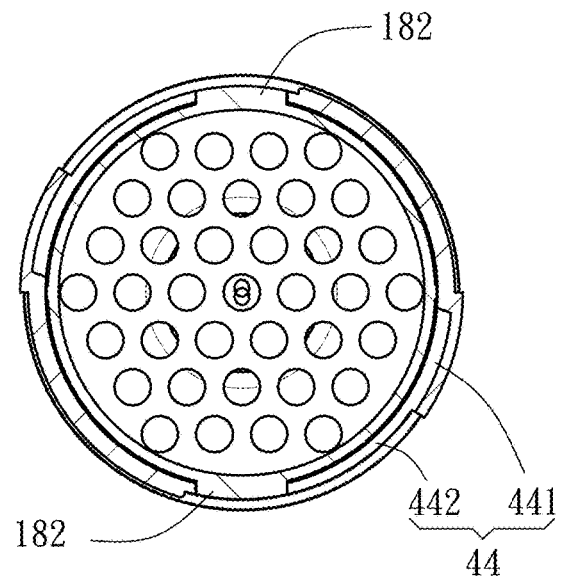
FIG. 20 is a sectional view taken along the line 20-20 in FIG. 19.

Referring to FIG. 13 to FIG. 15, when the hollow pillar 10 and the hollow pillar 40 are connected together, the lower end portion 18 of the hollow pillar 10 is accommodated in the placement chamber 413 of the hollow pillar 40. The through holes 191 of the bottom 19 of the lower end portion 18 communicate with the placement chamber 413. Further speaking, as shown in FIG. 17 and FIG. 18, the positioning ribs 182 of the hollow pillar 10 are slidden downwardly along the vertical sections 441 of the positioning grooves 44 of the hollow pillar 40, so that the positioning ribs 182 are located in the vertical sections 441 of the positioning grooves 44. Then, as shown in FIG. 19 and FIG. 20, the hollow pillar 10 is rotated, making the positioning ribs 182 gradually moved from the vertical sections 441 of the positioning grooves 44 to the transverse sections 442 of the positioning grooves 44 respectively and guided by the transition regions 443 of the transverse sections 442 during the movement, thereby gradually moved to the embedding regions 444. At this time, the positioning ribs 182 are stopped by the stopping stair parts 447, that makes the positioning ribs 182 less easy to slide reversely from the embedding regions 444 to the transition regions 443, so that the positioning ribs 182 are firmly embedded in the embedding regions 444 of the positioning grooves 44. As a result, the hollow pillar 10 and the hollow pillar 40 are firmly connected with each other and fixed, so as to compose the planting column 3 of the third embodiment of the present invention as shown in FIG. 13. If the user wants to separate the hollow pillar 10 from the hollow pillar 40, the user only needs to perform the above-described process reversely.

Figure 21:
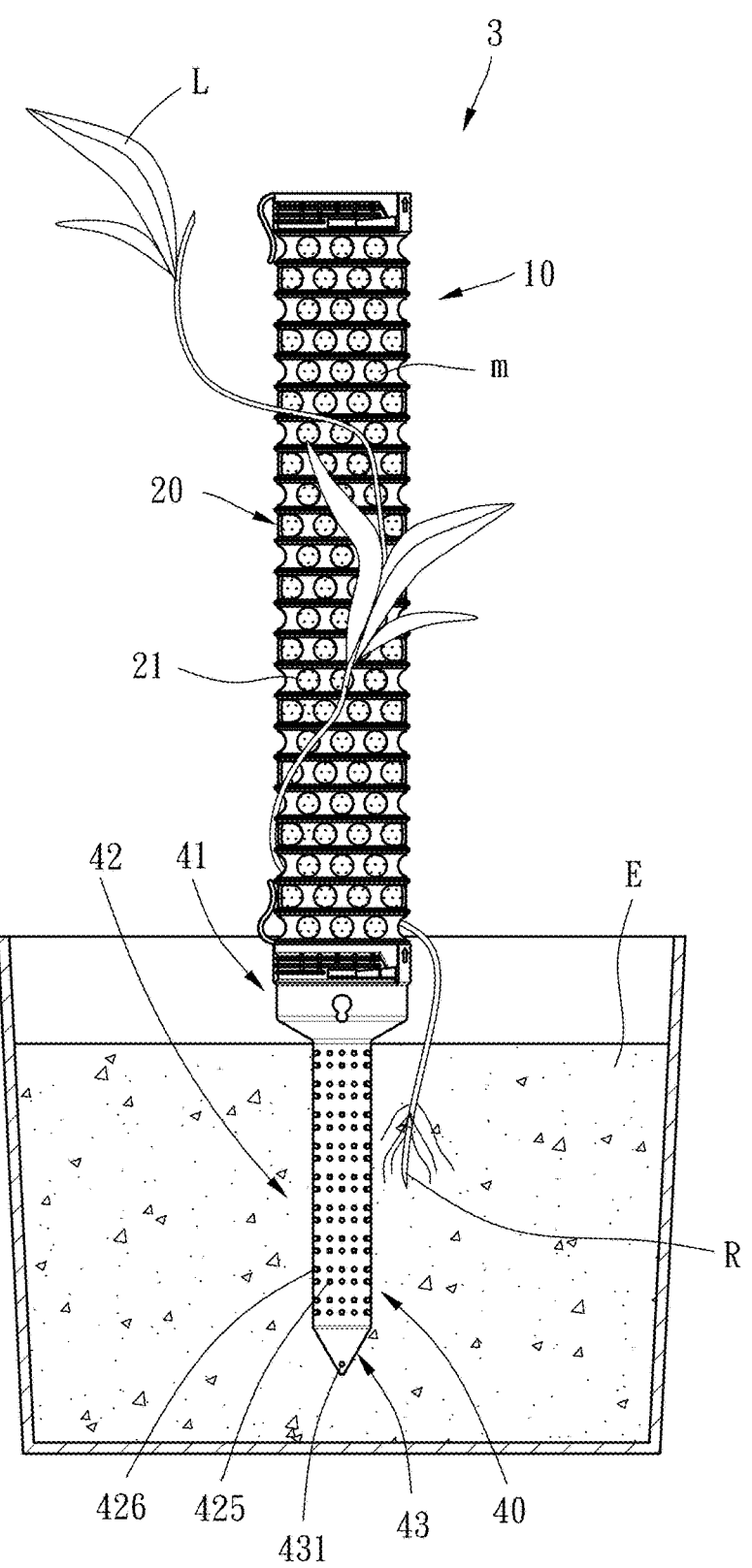
FIG. 21 is a schematic view showing that the planting column according to the third preferred embodiment of the present invention is inserted in the soil.

Referring to FIG. 14 and FIG. 21, when the planting column 3 of the third embodiment of the present invention is practically in use, the user can fill the accommodating chamber 22 of the hollow pillar 10 with a medium m, such as fertilizer, sphagnum moss, coir or expanded clay aggregate. The medium m is stopped by the bottom 19 of the lower end portion 18 of the hollow pillar 10 from slipping out from the accommodating chamber 22. Then, the above-described process is performed to connect the hollow pillar 10 and the hollow pillar 40 together. After that, the lower end portion 43 of the hollow pillar 40 is inserted into the soil E, and the taper-shaped lower end portion 43 makes the hollow pillar 40 firmly inserted in the soil E. When the climbing plant L climbs on the hollow pillar 10, the aerial root of the climbing plant L can go deep into the through holes 21 of the body portion 20 of the hollow pillar 10 to adsorb water and nutrients. It should be additionally mentioned here that the hollow pillar 40 can be entirely embedded in the soil E. Alternatively, the hollow pillar 10 can be also inserted in the soil E along with the hollow pillar 40. The depth of the insertion in the soil E can be adjusted by the user according to the requirement of the user. Besides, the lower end portion 43 of the hollow pillar 40 is unlimited to the taper shape, but the taper shape can attain relatively firmer insertion.

Continuing with the above description, when the user waters the hollow pillar 10 from above it, water will enter the top opening 111 of the upper end portion 11 to be absorbed by the medium m in the accommodating chamber 22. After the medium m absorbs water from top to bottom and becomes saturated, water will seep out of the hollow pillar 10 through the through holes 21, and water will also flow into the placement chamber 413 of the hollow pillar 40 through the through holes 191 of the lower end portion 18 and flow through the first through holes 425 and the second through holes 426 of the body portion 42 of the hollow pillar 40 and the through holes 431 of the lower end portion 43 to flow into the soil E, so that the root R of the climbing plant L as shown in FIG. 21 can favorably adsorb water or nutrients from the soil E. However, the user may not fill the accommodating chamber 22 of the hollow pillar 10 with the medium m, and water and oxygen can be still conveyed through the through holes 21 and the through holes 191 of the hollow pillar 10 and the first and second through holes 425 and 426 and the through holes 431 of the hollow pillar 40. As a result, the planting column 3 of the third embodiment of the present invention can improve water permeability of the soil E, thereby preventing the root R of the climbing plant L from being soaked in excessive water to rot away. Besides, the planting column 3 of the third embodiment of the present invention can also improve breathability of the soil E, thereby preventing the root R of the climbing plant L from oxygen lack and the resulting necrosis.

It should be additionally mentioned here that as shown in FIG. 16, the first through holes 425 and the second through holes 426 of the hollow pillar 40 are arranged in a parallel staggered manner to surround the tube body 423, so water, nutrients or oxygen can be conveyed into the soil E relatively more comprehensively through the first and second through holes 425 and 426, so as to improve the water permeability and breathability of the soil E.

Figure 22:
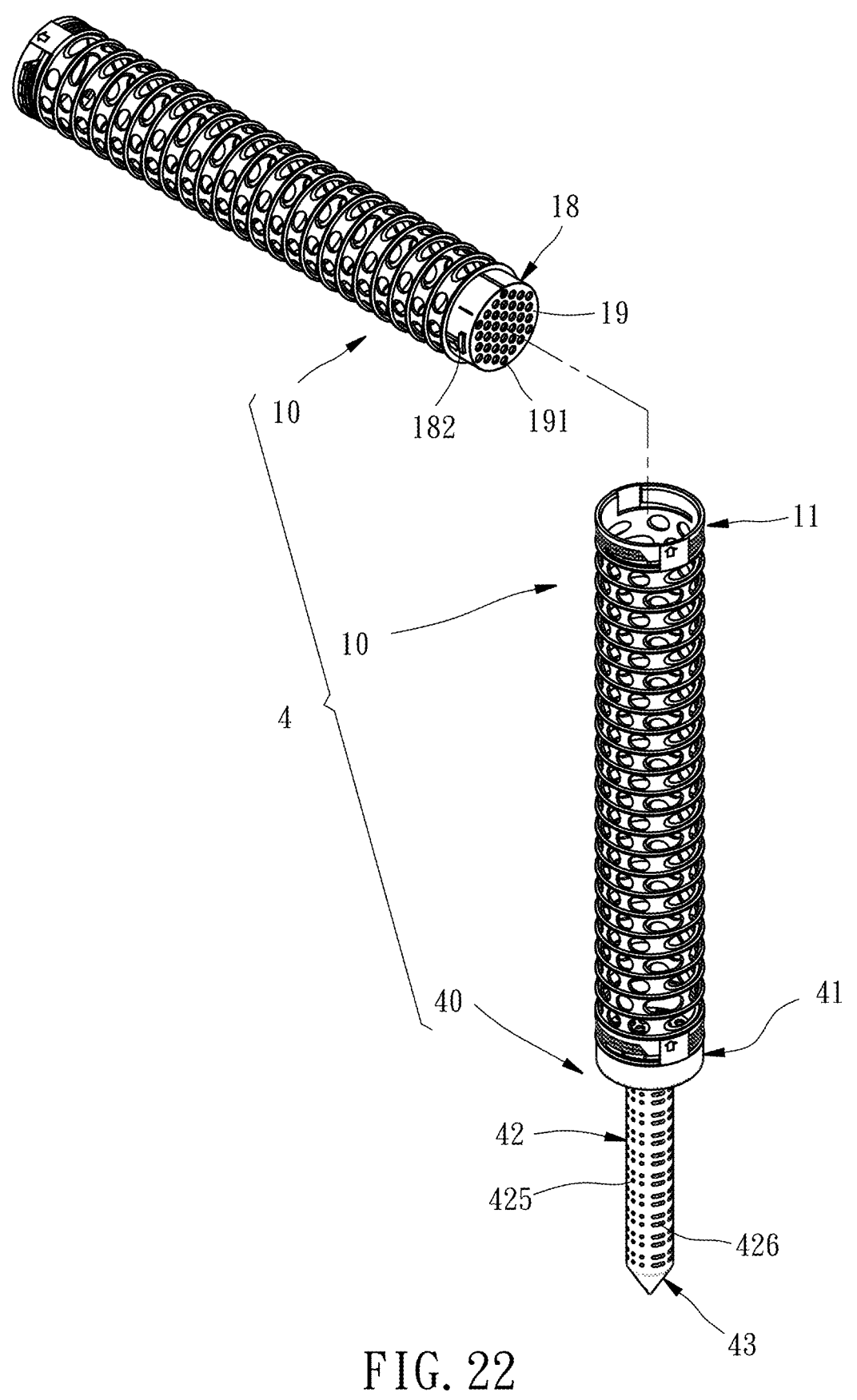
Figure 23:
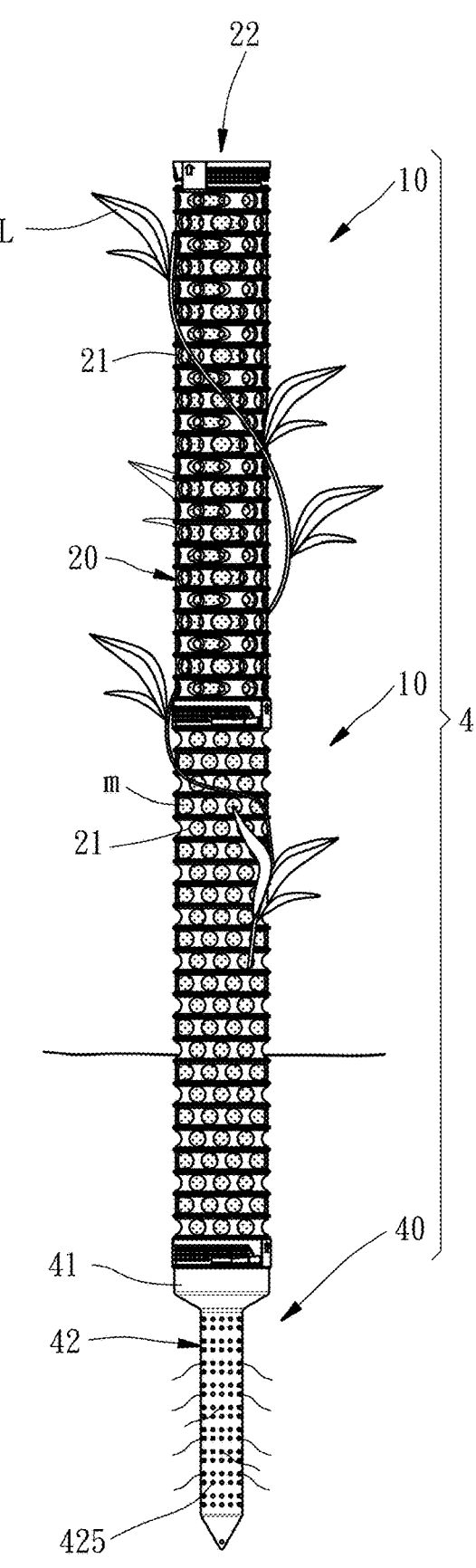
FIG. 23 is a schematic view showing that a first hollow pillar of the planting column according to the fourth preferred embodiment of the present invention is inserted in the soil.

The user can install two or more than two hollow pillars 10 on the hollow pillar 40. Referring to FIG. 22 and FIG. 23, a planting column 4 according to a fourth preferred embodiment of the present invention is approximately the same with the third preferred embodiment in structure, but the primary difference therebetween lies in that two hollow pillars 10 are connected in this embodiment, thereby composing the relatively higher planting column 4. The amount of the hollow pillar 10 for assembly can be adjusted according to the growth height of the climbing plant L. When the two hollow pillars 10 are connected together, the lower end portion 18 of the upper hollow pillar 10 is inserted in the upper end portion 11 of the lower hollow pillar 10 in a way that the positioning ribs 182 of the upper hollow pillar 10 are firmly embedded in the positioning grooves 12 of the lower hollow pillar 10, such that the assembly for the two hollow pillars 10 is accomplished. The assembling manner for the two hollow pillars 10 is the same with that described in the second embodiment of the present invention, so the process thereof will not be repeatedly described hereinafter.

Figure 24:
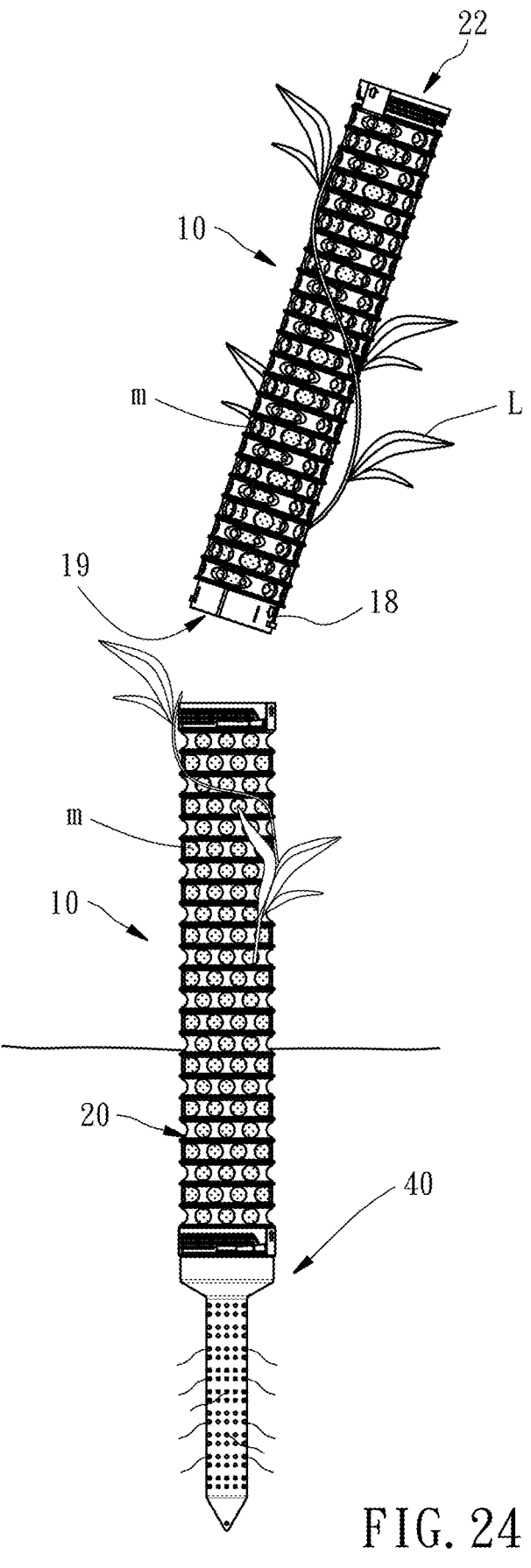
FIG. 24 is similar to FIG. 23, but showing the status that an upper second hollow pillar is separated from a lower second hollow pillar.

As shown in FIG. 23, when the planting column 4 is practically in use, the user firstly fills each of the accommodating chambers 22 of the two hollow pillars 10 with a medium m, such as sphagnum moss, coir or expanded clay aggregate, then performs the above-described process to connect the two hollow pillars 10 together, then inserts the lower end portion 18 of the lower hollow pillar 10 into the upper end portion 41 of the hollow pillar 40, and then inserts the hollow pillar 40 and a part of the body portion 20 of the lower hollow pillar 10 into the soil for fixing. It should be additionally mentioned here that the depth of inserting the body portion 20 of the lower hollow pillar 10 and the hollow pillar 40 into the soil can be adjusted by the user according to the requirement of the user. When the user waters the climbing plant L from above it, water will be absorbed by the media m in the accommodating chambers 22. After the media m absorb water from top to bottom and become saturated, water will seep out of the hollow pillars 10 through the through holes 21 of the body portions 20 and the through holes 191 of the bottoms 19 of the lower end portions 18 (as shown in FIG. 22), and seep out of the hollow pillar 40 through the first and second through holes 425 and 426 of the body portion 42 and the through holes 431 of the lower end portion 43. When the climbing plant L climbs on the hollow pillars 10, the aerial root of the climbing plant L can go deep into the through holes 21 of the body portions 20 to adsorb water and nutrients. As shown in FIG. 24, when the user divides the climbing plant L for ramet, because the taproot of the climbing plant L is blocked by the bottom 19 of the lower end portion 18 of the upper hollow pillar 10, the growth scope of the taproot is restricted, so that the climbing plant L on the lower hollow pillar 10 will not be affected. Besides, the medium m filled in the accommodating chamber 22 is also stopped by the bottom 19 of the lower end portion 18 of the upper hollow pillar 10 from coming off from the accommodating chamber 22. Therefore, the user can easily divide the climbing plant L for ramet only by separating the upper hollow pillar 10 from the lower hollow pillar 10.

It can be known from the above contents that for the planting columns 1-4 of the present invention, the lower end portion 18 of the hollow pillar 10 is inserted in the soil, and the bottom seat 30 is supported on the surface of the soil or the taper-shaped lower end portion 43 of the hollow pillar 40 is directly inserted in the soil. Besides, for the planting columns 1-4 of the present invention, the accommodating chamber 22 of the hollow pillar 10 is filled with the medium m, such as sphagnum moss, coir or expanded clay aggregate, so that when the climbing plant L climbs on the hollow pillar 10, the aerial root of the climbing plant L can go deep into the through holes 21 of the body portion 20 to adsorb water and nutrients. As a result, the structures of the planting columns 1-4 of the present invention help for the climbing plant L to climb thereon. Furthermore, the planting columns 2 and 4 of the present invention are adjustable in overall height thereof according to the growth height of the climbing plant L. When the user needs to divide the climbing plant L for ramet, the upper hollow pillar 10 can be easily separated from the lower hollow pillar 10, and the medium m filled in the accommodating chamber 22 is stopped by the bottom 19 of the lower end portion 18 of the upper hollow pillar 10 from coming off from the accommodating chamber 22. As a result, the structures of the planting columns 2 and 4 of the present invention help for the ramet for the climbing plant L. In addition, the planting column composed of the hollow pillar 10 and the hollow pillar 40 is also adapted for conveying water and oxygen, thereby improving the water permeability of the soil E to prevent the root R of the climbing plant L from being soaked in excessive water to rot away, and improving the breathability of soil E to prevent the root R of the climbing plant L from oxygen lack and the resulting necrosis.

Figure 25:
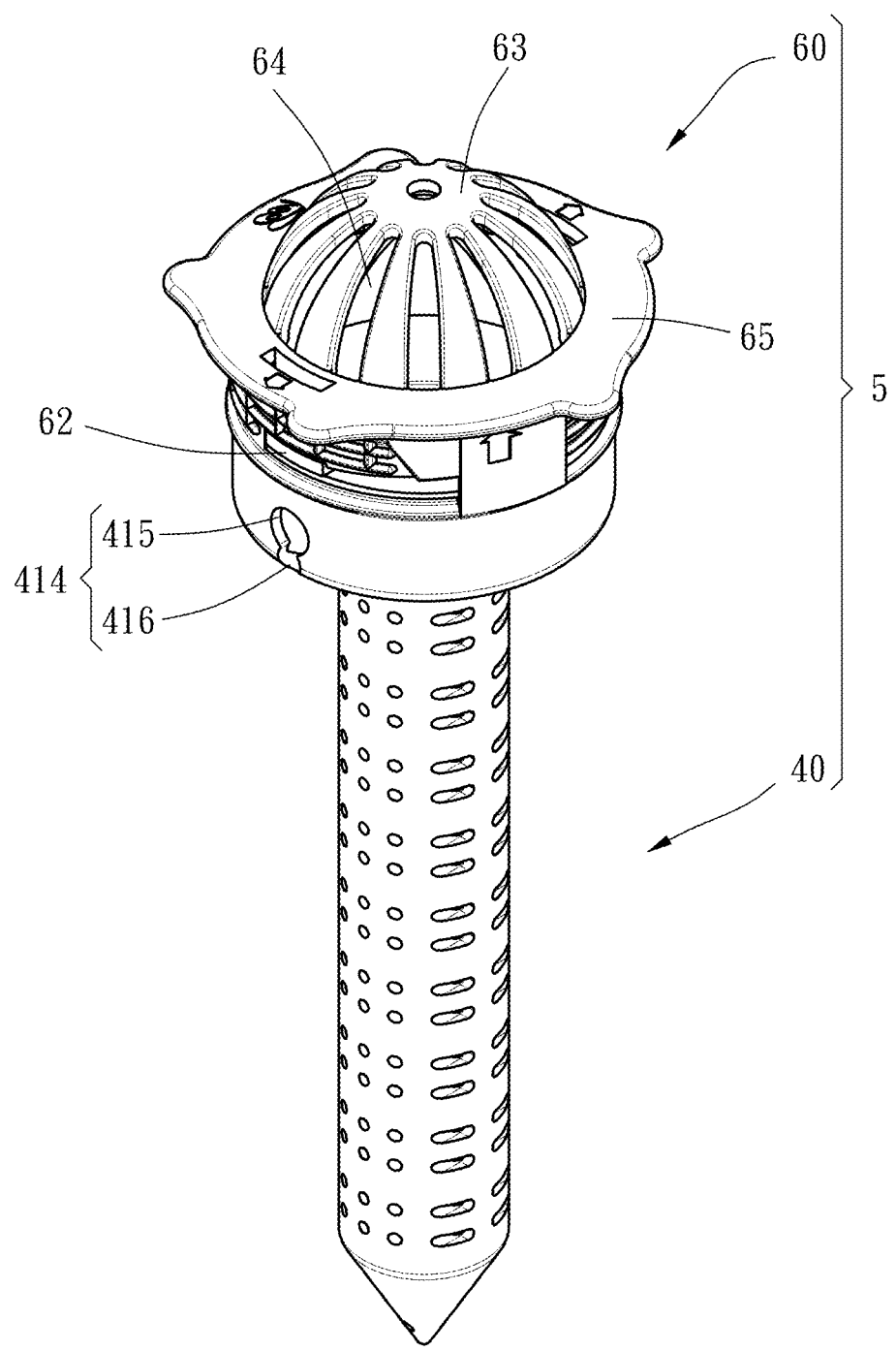
FIG. 25 is an assembled perspective view of a planting column according to a fifth preferred embodiment of the present invention.
Figure 26:
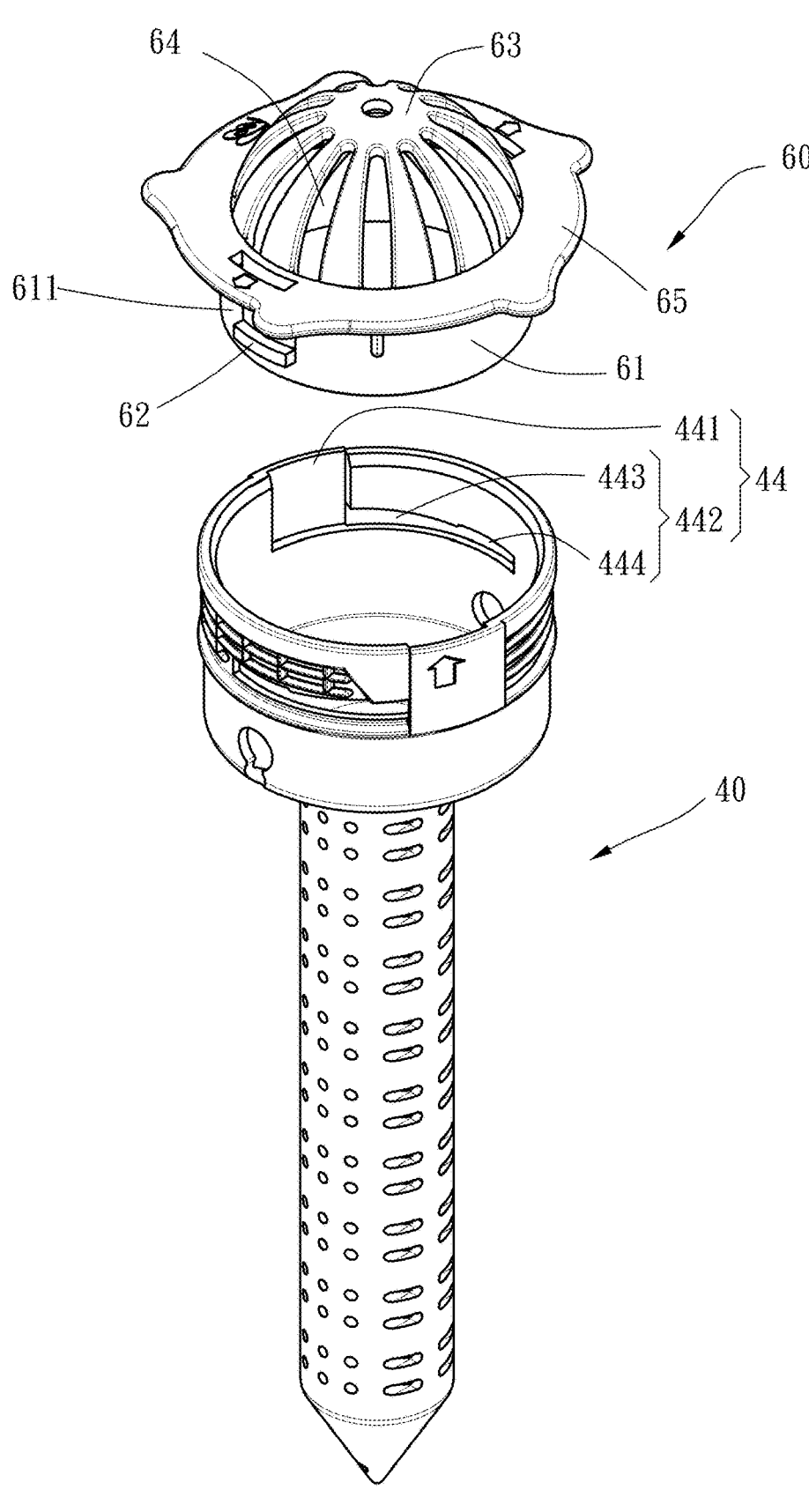
FIG. 26 is an exploded perspective view of the planting column according to the fifth preferred embodiment of the present invention.
Figure 27:
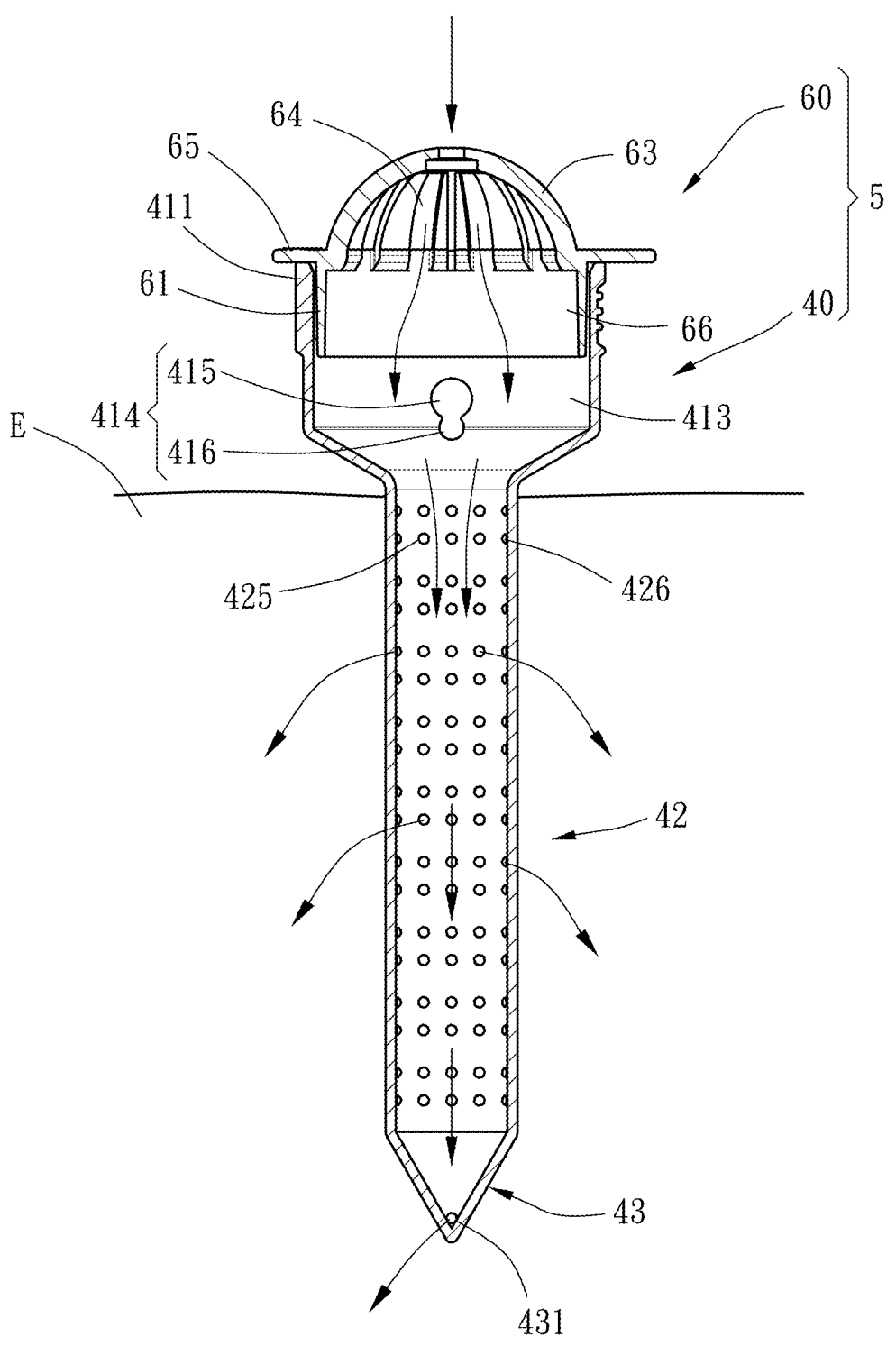
FIG. 27 is a schematic sectional view showing that the planting column according to the fifth preferred embodiment of the present invention is inserted in the soil, and showing flowing directions of water or oxygen.

However, the hollow pillar 40 can be used in coordination with another fitting. Referring to FIG. 25 to FIG. 27, a planting column 5 according to a fifth preferred embodiment of the present invention includes a hollow pillar 40 and a fitting 60, wherein the hollow pillar 40 is similar to that described in the third and fourth preferred embodiments, thereby not repeatedly described hereinafter. In this embodiment, the fitting 60 is a drain head. The fitting 60 (drain head) has a lower end portion 61, an arc receiving portion 63 connected with the lower end portion 61, an abutting plate 65 located between the lower end portion 61 and the arc receiving portion 63, and a cavity 66 located in the lower end portion 61. The lower end portion 61 includes an outer circumferential surface 611, and two positioning ribs 62 located on the outer circumferential surface 611 and opposite to each other. The positioning ribs 62 are matched with the positioning grooves 44 of the hollow pillar 40. The arc receiving portion 63 has a plurality of through holes 64 communicating with the cavity 66.

When the fitting 60 (drain head) and the hollow pillar 40 are connected together, the lower end portion 61 of the fitting 60 (drain head) is accommodated in the placement chamber 413 of the hollow pillar 40, and the positioning ribs 62 of the fitting 60 (drain head) are embedded in the embedding regions 444 of the positioning grooves 44 of the hollow pillar 40 according to the above-described assembling manner for the hollow pillars 10 and 40 in the third embodiment, making the cavity 66 of the lower end portion 61 communicate with the placement chamber 413, such that the assembly for the fitting 60 (drain head) and the hollow pillar 40 is accomplished. After the assembly is accomplished, the abutting plate 65 of the fitting 60 (drain head) is abutted on the top end of the annular barrel 411 of the hollow pillar 40, that makes the fitting 60 (drain head) connected with the hollow pillar 40 relatively more stably.

Figure 28:
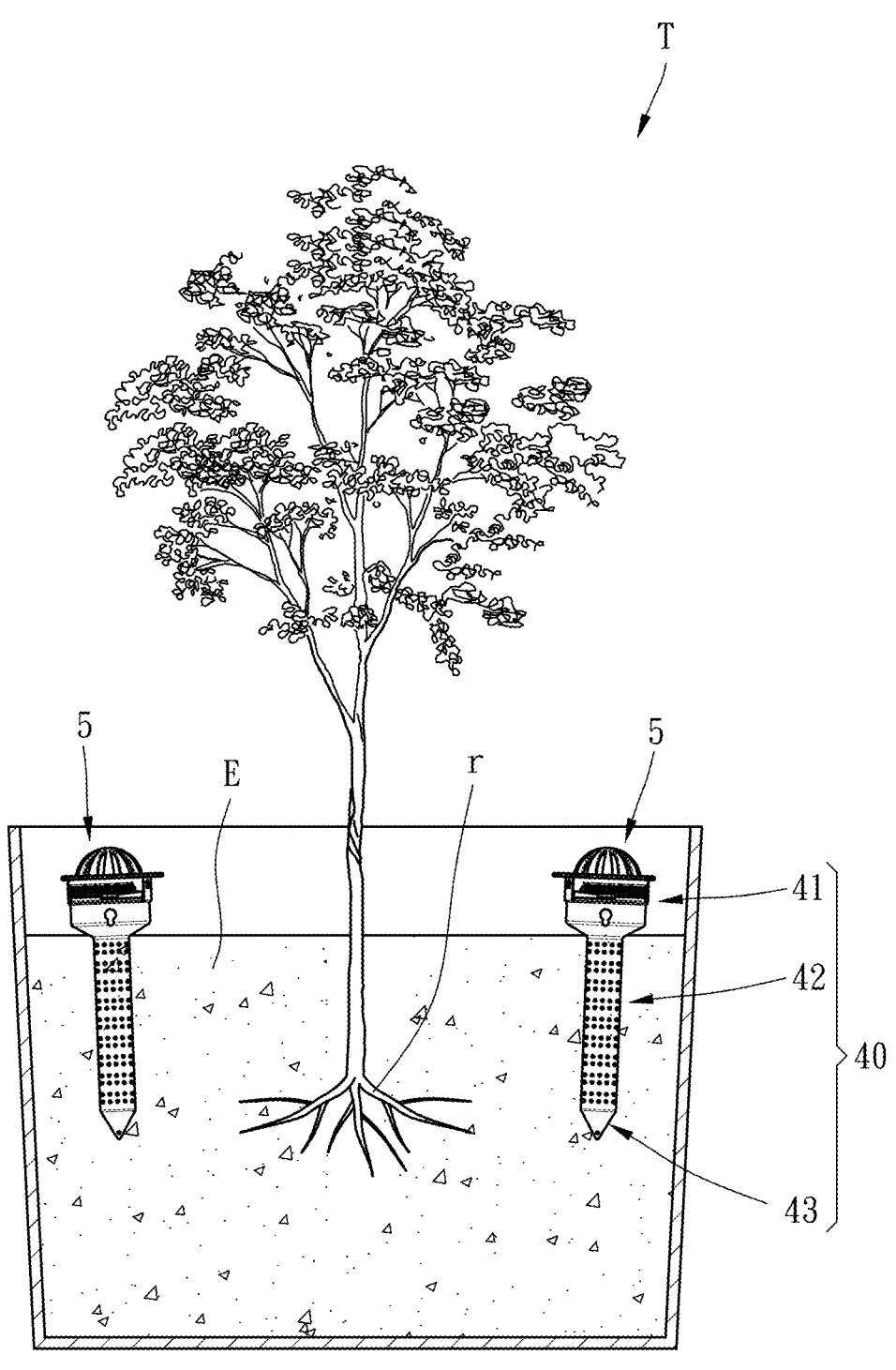
FIG. 28 is a schematic view showing that two planting columns according to the fifth preferred embodiment of the present invention are inserted in the soil.

When the planting column 5 of the fifth embodiment of the present invention is practically in use, at first, the fitting 60 (drain head) and the hollow pillar 40 are connected together. Then, the lower end portion 43 and body portion 42 of the hollow pillar 40 are inserted into the soil E and located adjacent to the root r of the plant T, as shown in FIG. 28, so that the taper-shaped lower end portion 43 makes the hollow pillar 40 firmly inserted in the soil E. It should be additionally mentioned here that as shown in FIG. 28, the user can install a plurality of planting columns 5 around the plant T. The amount of the planting column 5 is two in the figure, but unlimited to two. Besides, the hollow pillar 40 can be entirely embedded in the soil E. Alternatively, the fitting 60 (drain head) can be also inserted into the soil E along with the hollow pillar 40. The depth of the insertion in the soil E can be adjusted by the user according to the requirement of the user.

Continuing with the above description, when the user waters the fitting 60 (drain head) from above it, as shown in FIG. 27, water will enter the through holes 64 of the arc receiving portion 63, flow into the placement chamber 413 of the hollow pillar 40 through the cavity 66 of the lower end portion 61, and then permeate into the soil E through the first through holes 425, the second through holes 426 and the through holes 431 of the hollow pillar 40, so that the root r of the plant T as shown in FIG. 28 can favorably adsorb water from the soil E. Likewise, the planting column 5 of the fifth embodiment of the present invention can convey oxygen into the soil E through the through holes 64 and cavity 66 of the fitting 60 (drain head), and the first and second through holes 425 and 426 and the through holes 431 of the hollow pillar 40. As a result, the planting column 5 of the fifth embodiment of the present invention can improve the water permeability of the soil E to prevent the root r of the plant T from being soaked in excessive water to rot away. Besides, the planting column 5 of the fifth embodiment of the present invention can also improve the breathability of the soil E to prevent the root r of the plant T from oxygen lack and the resulting necrosis.

In addition, as shown in FIG. 27, the user can insert a water pipe (not shown) through the larger radius part 415 of the through hole 414 of the hollow pillar 40, allowing water to directly flowing into the placement chamber 413 of the hollow pillar 40 through the water pipe and then permeate into the soil E through the first through holes 425, the second through holes 426 and the through holes 431 of the hollow pillar 40, so that the root r of the plant T as shown in FIG. 28 can favorably adsorb water from the soil E. Besides, the user can provide a timing control device (not shown) to control the time for water to flow into the water pipe, thereby attaining the regularly watering effect.

It can be known from the above contents that for the planting columns 3-5 of the present invention, the hollow pillar 10 can be installed on the hollow pillar 40, or replaced by other different fittings 60 for satisfying the requirements of the user. Besides, in the planting columns 3-5 of the present invention, the hollow pillar 40 can improve the water permeability and breathability of the soil, so as to increase the practicability of the planting columns 3-5 of the present invention and increase the survival rate of the plant T and the climbing plant L.

Figure 29:
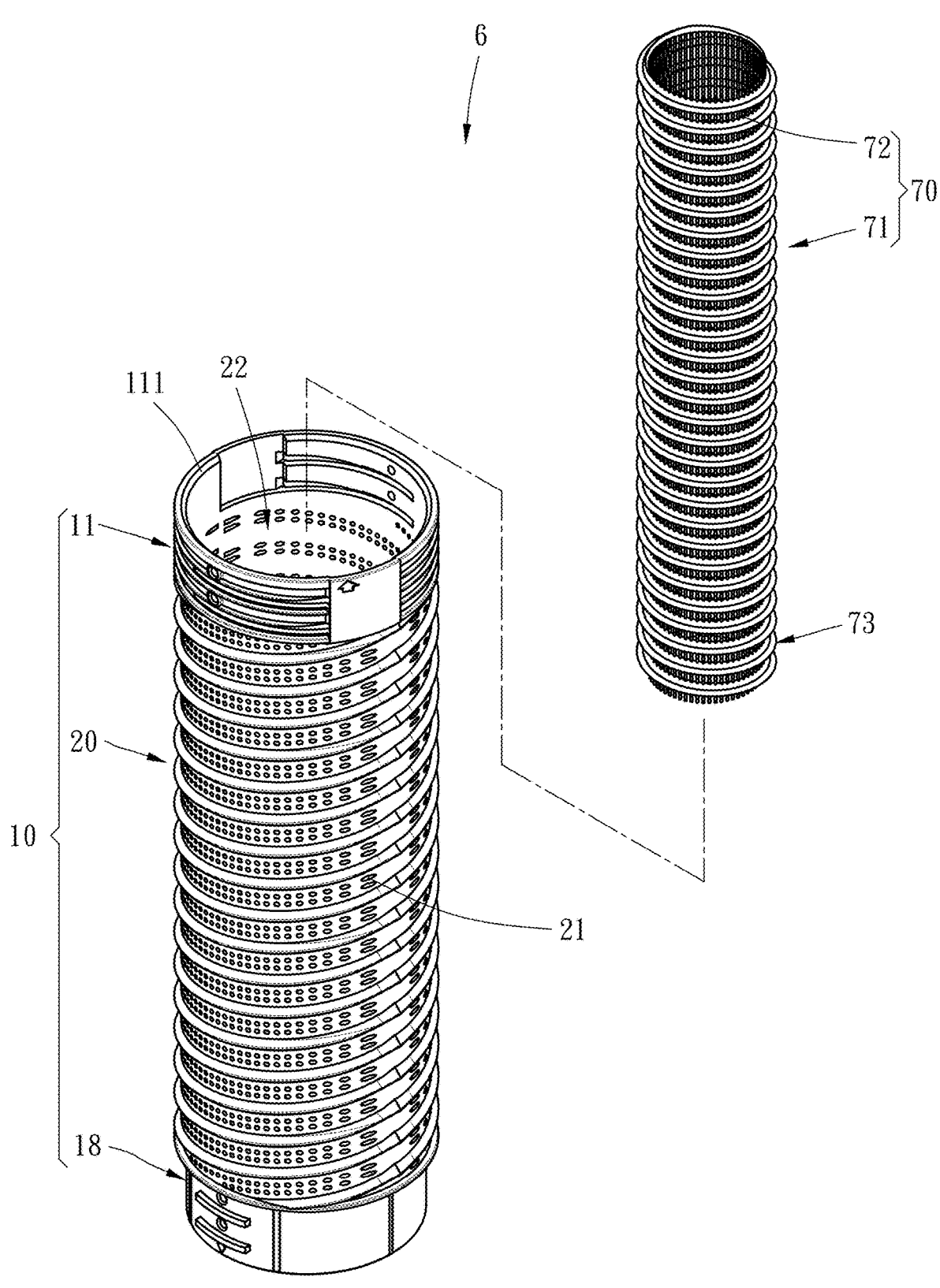
FIG. 29 is an exploded perspective view of a planting column according to a sixth preferred embodiment of the present invention.

Referring to FIG. 29, a planting column 6 according to a sixth preferred embodiment of the present invention includes a hollow pillar 10 and an inner pipe 70.

Figure 30:
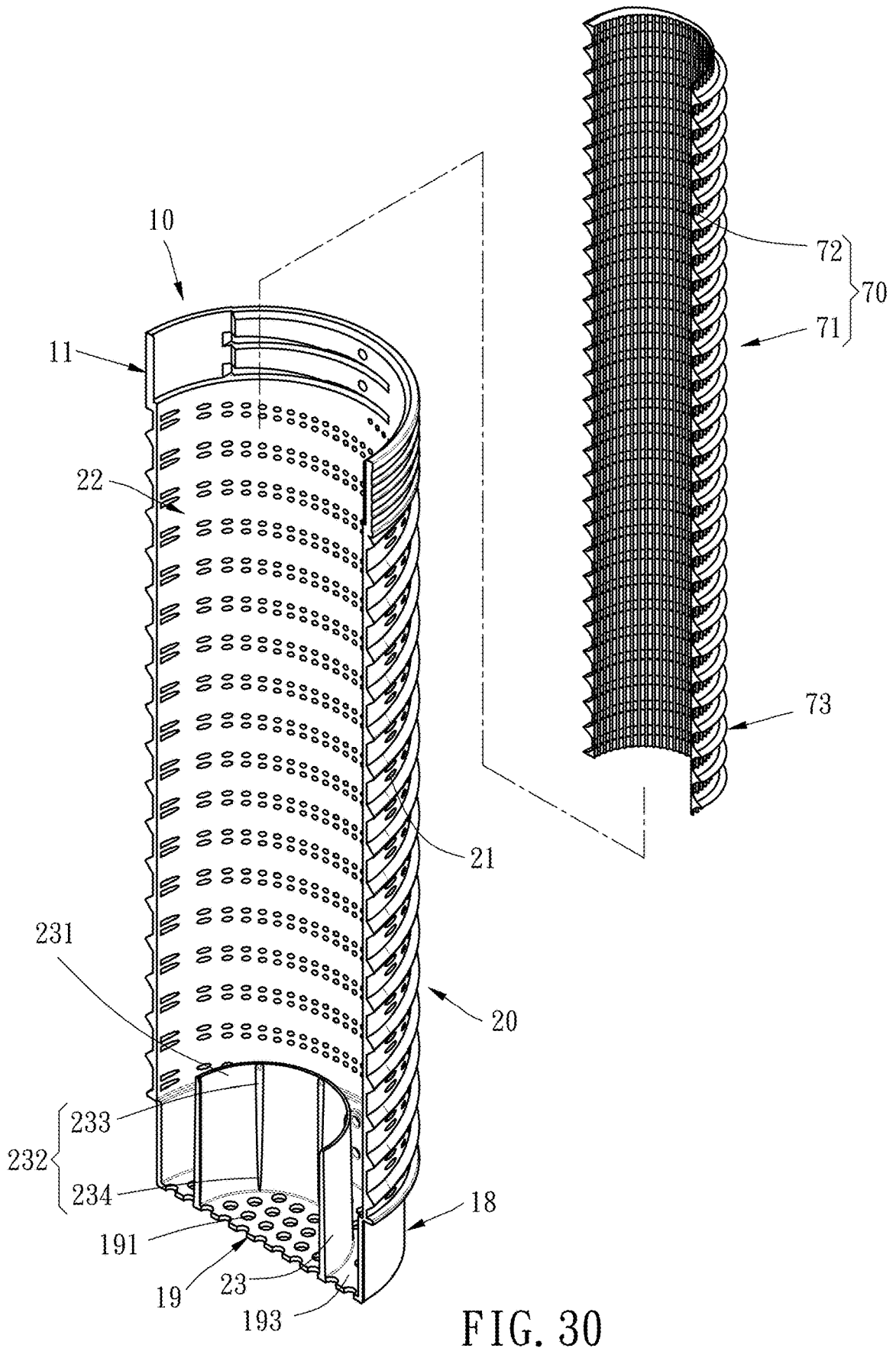
FIG. 30 is a cut-off exploded perspective view of the planting column according to the sixth preferred embodiment of the present invention.
Figure 31:
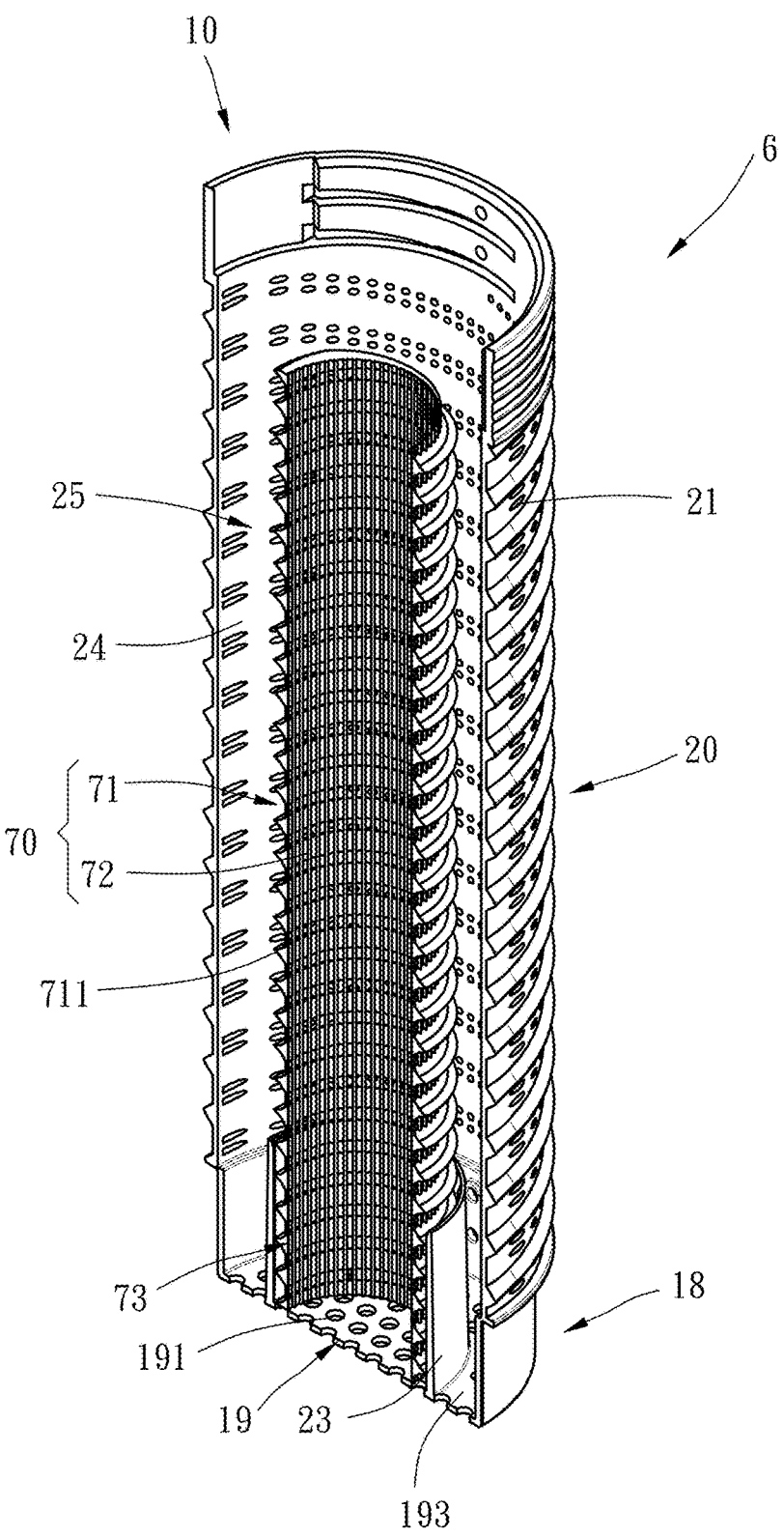
FIG. 31 is a cut-off assembled perspective view of the planting column according to the sixth preferred embodiment of the present invention.

As shown in FIG. 29 to FIG. 31, the hollow pillar 10 in this embodiment is similar to the hollow pillar 10 in the above embodiments, including an upper end portion 11, a lower end portion 18, a body portion 20 connected between the upper end portion 11 and the lower end portion 18, and an accommodating chamber 22 located in the body portion 20. The upper end portion 11 includes a top opening 111 communicating with the accommodating chamber 22. The body portion 20 includes a plurality of through holes 21. The lower end portion 18 includes a bottom 19, and a plurality of through holes 191 penetrating through the bottom 19. The hollow pillar 10 in this embodiment further includes a combining portion 23. The combining portion 23 is annular in shape, and extends upwardly from the inner surface 193 of the bottom 19. The combining portion 23 includes an inner surface 231, and a plurality of ribs 232 located on the inner surface 231. The ribs 232 extend in the axial direction of the body portion 20, and each rib 232 has a top end 233 and a bottom end 234 opposite to the top end 233. Each rib 232 has a taper shape gradually narrowing from the top end 233 to the bottom end 234.

As shown in FIG. 29 to FIG. 31, the inner pipe 70 includes an inner pipe wall 71, and a plurality of inner holes 72 penetrating through the inner pipe wall 71. The bottom end of the inner pipe wall 71 has a fixing end portion 73.

Figure 32:
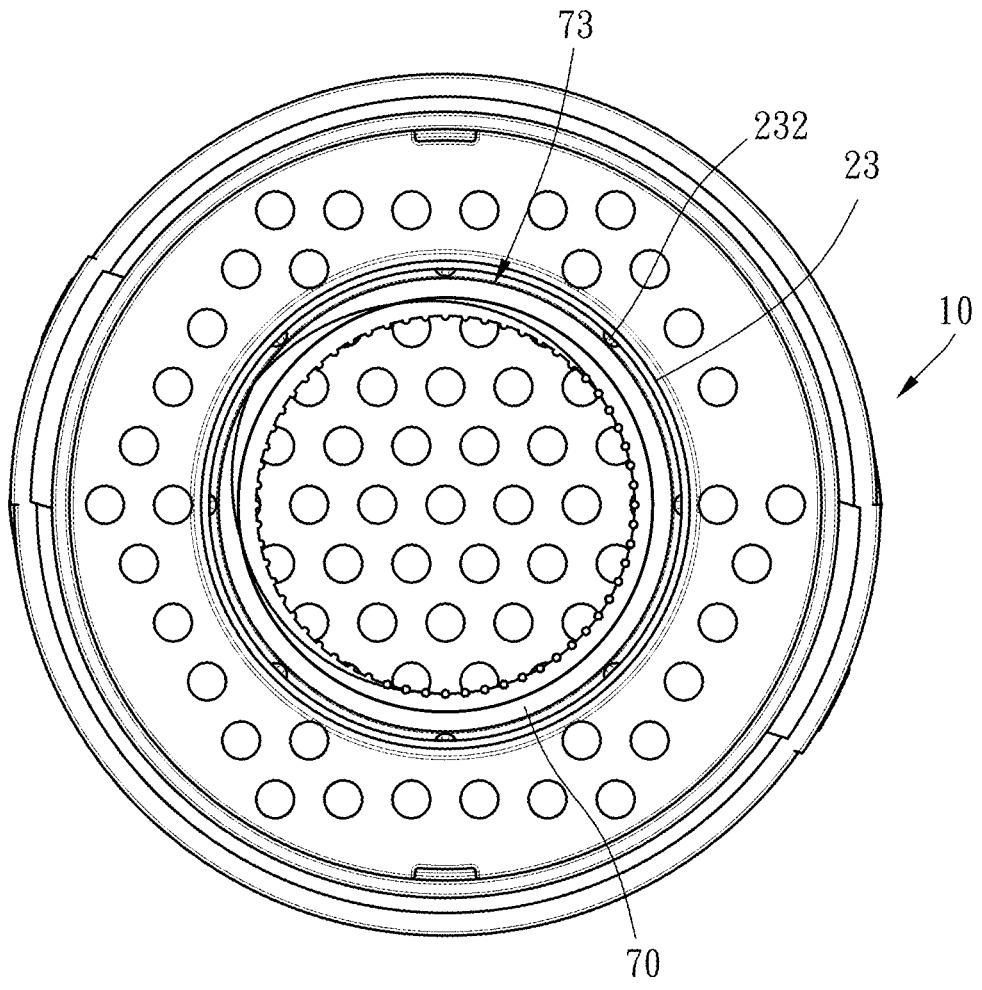
FIG. 32 is a top view of the planting column according to the sixth preferred embodiment of the present invention.

During the practical assembly, the user has to place the inner pipe 70 into the accommodating chamber 22 of the hollow pillar 10, and applies a force to insert the fixing end portion 73 of the inner pipe 70 into the combining portion 23 of the hollow pillar 10, making the bottom end of the fixing end portion 73 abutted against the bottom 19 of the hollow pillar 10 and making an accommodating space 25 formed between an outer surface 711 of the inner pipe wall 71 and an inner surface 24 of the body portion 20 of the hollow pillar 10, such that the assembly of the planting column 6 of the sixth embodiment of the present invention is accomplished. If the user wants to separate the hollow pillar 10 and the inner pipe 70 from each other, the user only needs to apply a force to pull out the fixing end portion 73 of the inner pipe 70 from the combining portion 23 of the hollow pillar 10. It should be additionally mentioned here that as shown in FIG. 30 to FIG. 32, the outer radius of the fixing end portion 73 of the inner pipe 70 is approximately equal to the inner radius of the combining portion 23 of the hollow pillar 10. Therefore, when the fixing end portion 73 and the combining portion 23 are fixed to each other, the ribs 232 make them in the tightly fit status. Because the ribs 232 of the combining portion 23 are taper in shape, the fixing end portion 73 of the inner pipe 70 is uneasy to come off from the combining portion 23 of the hollow pillar 10.

Figure 33:
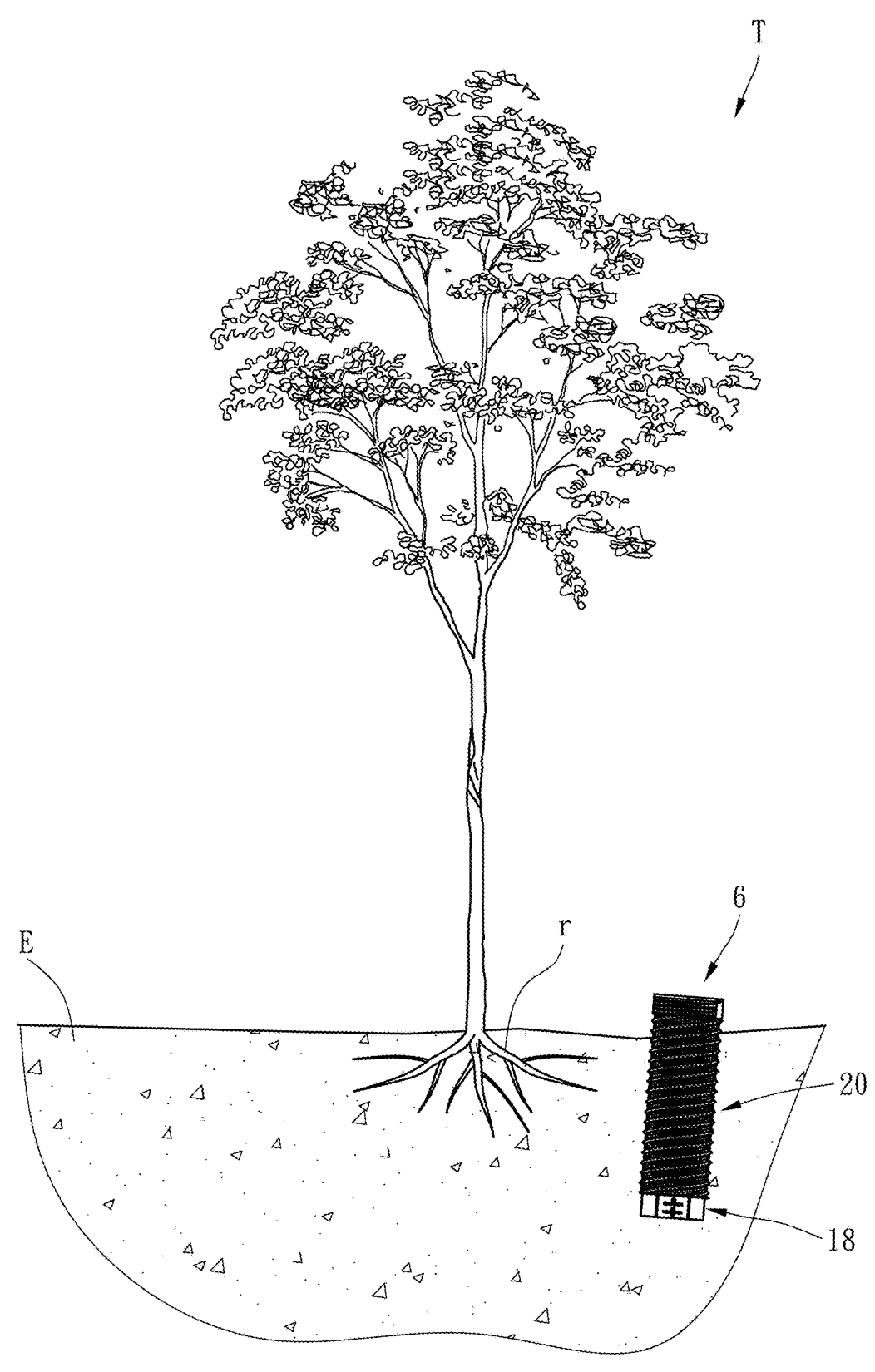
FIG. 33 is a schematic view showing that the planting column according to the sixth preferred embodiment of the present invention is inserted in the soil.

Referring to FIG. 31 and FIG. 33, when the planting column 6 of the sixth embodiment of the present invention is practically in use, the user inserts the lower end portion 18 and a part of the body portion 20 of the hollow pillar 10 into the soil E closely to the root r of the plant T. At this time, the outside oxygen enters the accommodating space 25 and the inner pipe 70, and the oxygen is conveyed through the inner holes 72 of the inner pipe 70, the through holes 21 of the hollow pillar 10 and the through holes 191 of the hollow pillar 10, so that relatively more space is provided for the oxygen in the inner pipe 70 to be favorably conveyed into the soil E to improve the breathability of the soil E, allowing the root r of the plant T to absorb relatively more oxygen.

Figure 34:
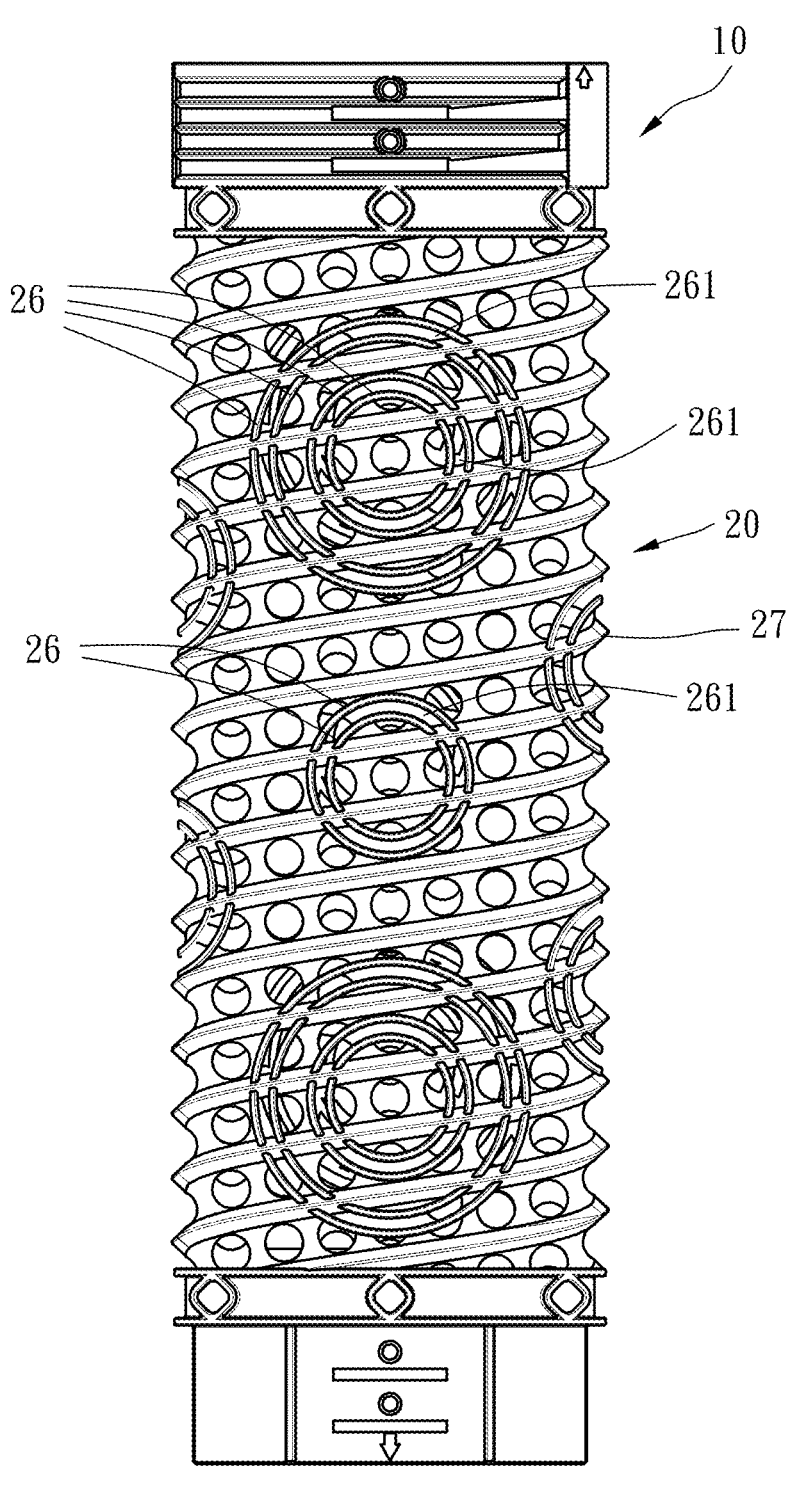
FIG. 34 is a front view of a hollow pillar of a planting column according to a seventh preferred embodiment of the present invention.
Figure 35:
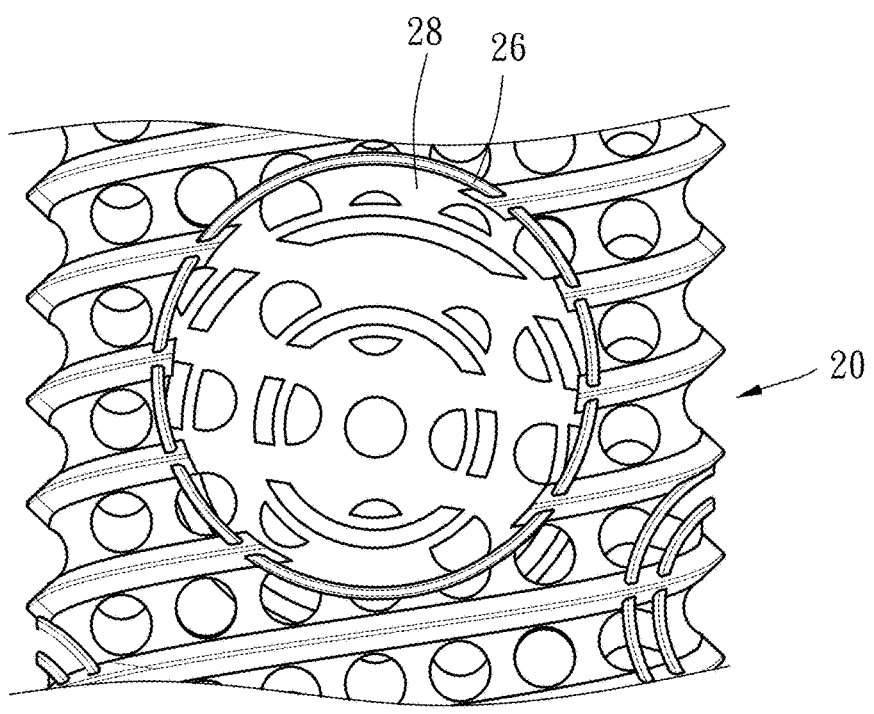
FIG. 35 is a partially enlarged view of the hollow pillar of the planting column according to the seventh preferred embodiment of the present invention, showing the status that the partial hollow pillar within an annular rib is removed.
Figure 36:
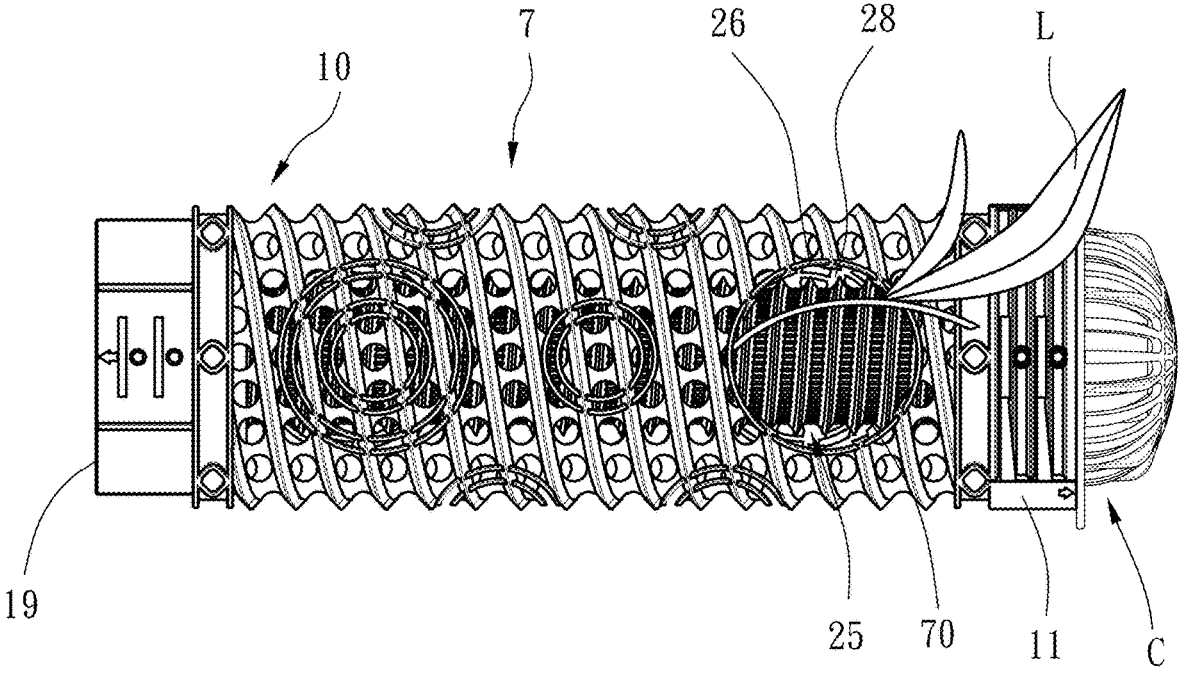
FIG. 36 is a schematic view showing a practical application of the planting column according to the seventh preferred embodiment of the present invention.

Referring to FIG. 34 to FIG. 36, a planting column 7 according to a seventh preferred embodiment of the present invention is similar to the planting column 6 according to the sixth preferred embodiment, but the primary difference therebetween lies in that the hollow pillar 10 of the planting column 7 has a plurality of annular ribs 26 (unlimited in amount). The annular ribs 26 are provided on an outer surface 27 of the body portion 20 of the hollow pillar 10. In this embodiment, the arrangement of the annular ribs 26 includes the following two types. The first type is that four annular ribs 26 are arranged as concentric circles, wherein a hollow area 261 is formed between the outermost annular rib 26 and the annular rib 26 adjacent thereto, and another hollow area 261 is formed between the innermost annular rib 26 and the annular rib 26 adjacent thereto. The second type is that two annular ribs 26 are arranged as concentric circles, and a hollow area 261 is formed between the annular ribs 26. However, there may be a single annular rib 26 provided on the outer surface 27 to surround a hollow area 261 formed on the body portion 20.

As shown in FIG. 35, the user can use a tool, such as pilers, to remove the entire part of the body portion 20 located within the outermost annular rib 26 to obtain a big hole 28. As a result, the user can place the medium, such as soil, sphagnum moss, coir, foamed gravel, into the accommodating space 25 between the hollow pillar 10 and the inner pipe 70. Because the medium is stopped by the bottom 19 of the hollow pillar 10, the medium will not slip out from the accommodating space 25. After that, as shown in FIG. 36, the user can place the planting column 7 of the seventh embodiment of the present invention horizontally, allowing the climbing plant L to stretch out through the big hole 28 of the hollow pillar 10 to grow. Besides, a cover C is utilized to cover the top opening 111 (as shown in FIG. 29) of the upper end portion 11 of the hollow pillar 10, making the medium filled in the accommodating space 25 stopped by the cover C, so that the medium will not slip out from the accommodating space 25. Alternatively, the planting column 7 of the seventh embodiment of the present invention can be placed vertically, which means rotating the planting column 7 shown in FIG. 36 counterclockwise for 90 degrees to orientate it as shown in FIG. 34, and at this time the cover C may be not disposed thereon. Alternatively, the planting column 7 of the seventh embodiment of the present invention can be hanged on the wall, widow frame or ceiling, allowing the climbing plant L to stretch out through the big hole 28 of the hollow pillar 10 to grow.

It can be known from the above contents that for the planting columns 6 and 7 of the present invention, the inner pipe 70 being detachably fixed in hollow pillar 10 enables water and oxygen to be conveyed into the soil through the inner holes 72 of the inner pipe 70 and the through holes 21 and the through holes 191 of the hollow pillar 10, so as to improve the water permeability and breathability of the soil E. Besides, the accommodating space 25 formed between the inner pipe 70 and the hollow pillar 10 may be not filled with any medium, or can be filled with different kinds of media, such as soil, foamed gravel, sphagnum moss or coir, so that the planting columns 6 and 7 of the present invention have even wider usability.

What is claimed is:

1. A planting column comprising:
a hollow pillar comprising an upper end portion, a lower end portion, a body portion located between the upper end portion and the lower end portion, and an accommodating chamber located in the body portion;
wherein the upper end portion comprises a top opening communicating with the accommodating chamber; the body portion comprises a plurality of through holes; the through holes of the body portion communicate the accommodating chamber with an outside of the hollow pillar; the lower end portion comprises an inner surface opposite to the top opening, an outer surface, and at least one through hole penetrating through the inner surface and the outer surface; the through hole of the lower end portion communicates the accommodating chamber with the outside of the hollow pillar;

wherein the upper end portion comprises an inner circumferential surface, and a positioning groove located on the inner circumferential surface; the lower end portion comprises an outer circumferential surface, and a positioning rib located on the outer circumferential surface and matchable with the positioning groove so that the positioning rib of the lower end portion of the hollow pillar is insertable in the positioning groove of the upper end portion of another said hollow pillar;

wherein the positioning groove has a vertical section extending in an axial direction of the upper end portion, and a transverse section extending in a chord direction of the upper end portion; the transverse section communicates with the vertical section, and the transverse section has a transition region and an embedding region; a first end of the transition region communicates with the vertical section; a second end of the transition region communicates with the embedding region, and a stopping stair part is formed at a juncture of the second end and the embedding region.

2. The planting column as claimed in claim 1, wherein the accommodating chamber of the hollow pillar is filled with a medium, and the medium is stopped by the inner surface of the lower end portion.

3. A planting column comprising:

a hollow pillar comprising an upper end portion, a lower end portion, a body portion located between the upper end portion and the lower end portion, and an accommodating chamber located in the body portion;

wherein the upper end portion comprises a top opening communicating with the accommodating chamber; the body portion comprises a plurality of through holes; the through holes of the body portion communicate the accommodating chamber with an outside of the hollow pillar; the lower end portion comprises an inner surface opposite to the top opening, an outer surface, and at least one through hole penetrating through the inner surface and the outer surface; the through hole of the lower end portion communicates the accommodating chamber with the outside of the hollow pillar;

wherein the planting column comprises two said hollow pillars; the two hollow pillars comprise a first hollow pillar and a second hollow pillar, which are different from each other; the upper end portion of the first hollow pillar has a placement chamber communicating with the top opening of the first hollow pillar; the accommodating chamber in the body portion of the first hollow pillar communicates with the placement chamber; the lower end portion of the second hollow pillar is detachably accommodated in the placement chamber of the first hollow pillar;

wherein the upper end portion of the first hollow pillar comprises an inner circumferential surface, and a positioning groove located on the inner circumferential surface; the lower end portion of the second hollow pillar comprises an outer circumferential surface, and a positioning rib located on the outer circumferential surface and matchable with the positioning groove so that the positioning rib of the lower end portion of the second hollow pillar is insertable in the positioning groove of the upper end portion of the first hollow pillar;

wherein the positioning groove has a vertical section extending in an axial direction of the upper end portion, and a transverse section extending in a chord direction of the upper end portion; the transverse section communicates with the vertical section, and the transverse section has a transition region and an embedding region; a first end of the transition region communicates with the vertical section; a second end of the transition region communicates with the embedding region, and a stopping stair part is formed at a juncture of the second end and the embedding region.

4. The planting column as claimed in claim 3, wherein the lower end portion of the first hollow pillar is taper in shape; the accommodating chamber of the second hollow pillar is filled with a medium; the medium is stopped by the inner surface of the lower end portion of the second hollow pillar.

* * * * *